US012754169B2

(12) United States Patent
Hörchens

(10) Patent No.: US 12,754,169 B2
(45) Date of Patent: Oct. 6, 2026

(54) METHOD FOR EXAMINING THE INTERIOR MATERIAL OF AN OBJECT, SYSTEM FOR CARRYING OUT THE METHOD, AND USE OF THE SYSTEM

(71) Applicant: Applus Netherlands B.V., Rotterdam (NL)

(72) Inventor: Lars Hörchens, Delfgauw (NL)

(73) Assignee: Applus Netherlands B.V., Rotterdam (NL)

( * ) Notice: Subject to any disclaimer, the term of this patent is extended or adjusted under 35 U.S.C. 154(b) by 86 days.

(21) Appl. No.: 18/569,963

(22) PCT Filed: Sep. 7, 2022

(86) PCT No.: PCT/NL2022/050506
§ 371 (c)(1),
(2) Date: Dec. 13, 2023

(87) PCT Pub. No.: WO2023/063814
PCT Pub. Date: Apr. 20, 2023

(65) Prior Publication Data

US 2024/0280540 A1 Aug. 22, 2024

(30) Foreign Application Priority Data

Oct. 12, 2021 (NL) ...................................... 2029384

(51) Int. Cl.
*G01N 29/04* (2006.01)
*G01N 29/50* (2006.01)
*G01N 29/06* (2006.01)

(52) U.S. Cl.
CPC ........... *G01N 29/043* (2013.01); *G01N 29/50* (2013.01); *G01N 29/069* (2013.01); *G01N 2291/106* (2013.01); *G01N 2291/267* (2013.01)

(58) Field of Classification Search
CPC .... G01N 29/043; G01N 29/50; G01N 29/069; G01N 2291/106; G01N 2291/267; G01N 29/28; G01N 29/262; G01N 29/4472
See application file for complete search history.

(56) References Cited

U.S. PATENT DOCUMENTS

2007/0277611 A1 12/2007 Portzgen et al.
2013/0058191 A1 3/2013 Molenaar et al.
2015/0000410 A1* 1/2015 Grimard .............. G01N 29/265 73/634

FOREIGN PATENT DOCUMENTS

CN 104508476 A 4/2015
WO WO-2018208151 A1 * 11/2018 ......... G01N 29/4472

OTHER PUBLICATIONS

European Patent Office, International Search Report in corresponding International Application No. PCT/NL2022/050506, dated Nov. 4, 2022 (3 pages).

(Continued)

*Primary Examiner* — Tarun Sinha
(74) *Attorney, Agent, or Firm* — Leydig, Voit & Mayer, Ltd.

(57) ABSTRACT

A method for examining the interior material of an object from a proximal surface of the object using ultrasound, wherein the method comprises processing receiving signals generated by a plurality of the ultrasound receivers in order to determine, according to the principle of inverse wave field extrapolation, where in the interior material of the object reflections and/or diffractions of a transmitted first ultrasound signal occurred, wherein the processing is based on at least one predetermined virtual grid of positions in a predetermined area of interest, the virtual grid being defined along a series of grid lines which extend along respective directions, of which at least a first one corresponds to an estimated local direction of a spatial gradient of ultrasound (Continued)

travel time from the at least first ultrasound transmitter to one or more of the plurality of ultrasound receivers.

30 Claims, 16 Drawing Sheets

(56) References Cited

OTHER PUBLICATIONS

Niels Portzgen et al., "Inverse Wave Field Extrapolation: A Different NDI Approach to Imaging Defects," IEEE Transactions on Ultrasonics, Ferroelectrics, and Frequency Control, vol. 54, No. 1, pp. 118-127 (Jan. 2007).
China National Intellectual Property Administration, Notification to Go through Formalities of Registration and Notification to Grant Patent Right for Invention in corresponding Chinese Patent Application No. 202280067664.2 dated Jul. 1, 2026.

* cited by examiner

METHOD FOR EXAMINING THE INTERIOR MATERIAL OF AN OBJECT, SYSTEM FOR CARRYING OUT THE METHOD, AND USE OF THE SYSTEM

CROSS-REFERENCE TO RELATED APPLICATIONS

This patent application is a U.S. National Phase of PCT International Application No. PCT/NL2022/050506, filed Sep. 7, 2022, which claims priority to Dutch Application No. 2029384, filed Oct. 12, 2021, which are both expressly incorporated by reference in their entireties, including any references contained therein.

FIELD OF THE INVENTION

The present invention concerns a method for examining the interior material of an object from a proximal outer surface of the object using ultrasound. The invention also concerns a system for carrying out the method, and use of the system.

BACKGROUND TO THE INVENTION

Methods for examining the interior material of an object from a proximal surface of the object using ultrasound are known. Such methods are used e.g. for inspection of welds. A known proposition in the context of such methods is referred to as Inverse Wave field Extrapolation (IWEX). In IWEX, the detected wave field can be traced back from the received signals to the positions where it came from, particularly the positions of virtual sources that arise due to the reflections and/or diffractions of the ultrasound supplied to the object. In the case of an examination of a weld (e.g. of a pipeline or a plate), a virtual source may be the position of a welding defect. The receiving signals are the starting point of the inverse wave field extrapolation. On the basis of the receiving signals, the time can be mathematically reversed. With the inverse wave field theory, the detected wave field is traced back to the position where it came from, namely the position of the virtual sources. The wave theory takes into account both the amplitude and the delay time of the signal. The process of tracing back the wave field measured is called inverse wave field extrapolation.

Practically, this may mean that for a received signal on position X outside the object, it is calculated back in time which portion of the received signal may have been caused by a reflection and/or diffraction on position Y within the object. This portion of the signal is characterized by its amplitude and phase. Thus, in this calculation, the amplitude, phase and arrival time (for calculating which portion of the signal may belong to position Y) of the received signal is taken into account. This portion of the signal which belongs to position Y is calculated for each received signal. The portions of the received signals (expressed in amplitude and phase) which belong to position Y are summed to obtain a characterizing value (for example also expressed in an amplitude and a phase) for position Y. This process is carried out for a plurality of positions Y, Y, Y", etc., within the object. The combined result (all characterizing values) for all of these positions provides the basis for making an image of the interior of the object. Each position Y, Y', Y", etc. may for example be represented by a pixel of the image wherein for example the intensity or color of the pixel corresponds to the amplitude of the characterizing value.

WO2005/068995, EP2565643 and WO2018/208151 provide further background information regarding IWEX.

While IWEX enables highly detailed examination, a disadvantage is that it can require relatively large storage space and processing time, which can be especially relevant in case of mobile applications in the field, where compact and light-weight equipment and speedy results are generally desirable.

SUMMARY OF THE INVENTION

An object of the invention is to provide a more efficient IWEX-based method for examining the interior material of an object from a proximal surface of the object using ultrasound. An object is to provide such a method which requires less storage space and/or processing time, in particular while providing at least substantially the same relevant information regarding the interior material. An object is to at least provide an alternative.

An aspect of the invention provides a method for examining the interior material of an object from a proximal surface of the object using ultrasound.

The method comprises, as a step a., transmitting at least a first ultrasound signal by at least a first ultrasound transmitter of a predetermined group of ultrasound transmitters to the interior material of the object, wherein in the interior material of the object reflections and/or diffractions of the first ultrasound signal occur.

The method comprises, as a step b., receiving reflections and/or diffractions of the first ultrasound signal from the interior material of the object using a plurality of ultrasound receivers of a predetermined group of ultrasound receivers which plurality of ultrasound receivers are acoustically coupled to the proximal surface of the object at positions which are distributed in at least one dimension of the proximal surface of the object, wherein, with each of the plurality of ultrasound receivers, a receiving signal is generated from the received reflections and/or diffractions of the at least first ultrasound signal from the interior material of the object.

The method comprises, as a step c., processing in combination the receiving signals generated by the plurality of the ultrasound receivers in order to determine, according to the principle of inverse wave field extrapolation, where in the interior material of the object reflections and/or diffractions of the transmitted first ultrasound signal occurred.

The processing is based on at least one predetermined virtual grid of positions at a predetermined area of interest which includes a part of the interior material of the object, each virtual grid of the at least one virtual grid being defined along a series of grid lines which extend along respective directions, of which at least a first one corresponds to an at least approximate local direction of a spatial gradient of ultrasound travel time from the at least first ultrasound transmitter to one or more of the plurality of ultrasound receivers.

It has been found that the processing can thus be made more efficient, in particular faster and/or with reduced storage space requirements, while still providing essentially the same relevant information regarding the interior material as in the known methods. In the known methods, the processing is usually based on a cartesian grid of positions which is not aligned with such a travel time gradient.

In particular, it has been found that the processing can thus be made more efficient because it can be sufficient to perform filtering operations along the grid lines only, thus essentially in one dimension, rather than in two dimensions as is generally required in case of the known cartesian grid.

Preferably, the first one of the directions corresponds to a grid line which is arranged centrally with respect to the virtual grid and/or with respect to the area of interest.

Preferably, for at least one virtual grid of the at least one virtual grid, at least one, preferably each, further one of said respective directions of the grid lines corresponds to a respective at least approximate local direction of a, e.g. the, spatial gradient of ultrasound travel time from the at least first ultrasound transmitter to one or more of the plurality of ultrasound receivers.

In this way the processing can be made particularly efficient. Such a virtual grid may then for example be defined as a polar grid, in particular with a reference point outside the predetermined area of interest.

Alternatively of additionally, for at least one virtual grid of the at least one virtual grid, at least one, preferably each, further one of said respective directions of the grid lines may be parallel to the said first respective direction.

It has been found that in this way the processing can still be made more efficient than in known methods. Such a virtual grid may then for example be defined as a rectangular grid, in particular with different spacing between grid positions for different dimensions of the rectangle. Such a rectangular grid may be oriented in various ways, for example such that one, e.g. a central one, of the grid lines is substantially aligned with a local direction of the aforementioned travel time gradient.

Optionally, at least one respective grid line of at least one, preferably each, virtual grid of the at least one virtual grid extends at an angle with a local main direction of sound propagation during use.

Alternatively or additionally, the at least one virtual grid may comprise a virtual grid of which at least one, preferably each, of the respective grid lines does not intersect a region where the plurality of ultrasound receivers and/or the at least first ultrasound transmitter are acoustically coupled to the proximal surface.

It has been found that, advantageously, the virtual grid can thus be better adapted to achieve efficient processing for different situations, in particular different modes which take different reflections into account.

As alluded to above, preferably at least one filter is applied to results of the processing, the at least one filter being applied only in one or more directions along the grid lines, in particular not in any direction across the grid lines.

The grid lines of such a virtual grid may intersect at a common intersection zone, for example at a common intersection point. Thus, in that case, the grid lines are mutually non-parallel. The common intersection zone or point is then preferably outside, in particular spaced apart from, the predetermined area of interest. The non-parallel grid lines preferably do not mutually intersect within the predetermined area of interest, at least for one virtual grid of the at least one virtual grid. The non-parallel grid lines may together define a fan shape, sector shape, pie-shape, annulus sector shape, trapezoid shape, or the like, in particular at the area of interest. An angular spacing between the non-parallel grid lines may be regular or non-regular.

In a virtual grid, positions may be defined at regular or non-regular intervals along the grid lines, for example at corresponding distances from an optional common intersection zone or point for multiple, e.g. each, of the grid lines. A spacing between positions along the grid lines may be smaller than, larger than, or the same as, a spacing across the grid lines.

Preferably, in at least one, more preferably each, virtual grid of the at least one virtual grid, a spacing between the positions is smaller along the grid lines than across the grid lines, at least in one area of the respective virtual grid, preferably throughout the respective virtual grid.

A virtual grid may or may not extend over the entire area of interest and may optionally extend outside the area of interest. Preferably, the virtual grid extends over at least a majority of the area of interest. Preferably, at least a majority of the positions of the virtual grid is within the area of interest. A virtual grid may include positions which are outside the material. Including positions outside the area of interest and/or outside the material in the virtual grid can help to simplify calculations and/or otherwise make processing more efficient.

Optionally, the predetermined area of interest is non-rectangular, for example having a trapezoidal or annulus sector shape. Such a shape can be particularly appropriate in case of weld inspection as an application. Alternatively, the area of interest may be shaped differently, for example having a rectangular shape.

Preferably, the at least one predetermined virtual grid comprises a plurality of, such as two, three, four, five, six seven or eight, mutually different predetermined virtual grids, in particular with different grid lines for each of the different grids.

The different grids may correspond to different travel time gradients associated with different possible travel paths of the ultrasound signal between the at least first transmitter and the plurality of receivers. Such different travel paths may in particular be associated with possible reflections and/or diffractions of an ultrasound signal in the interior material, as will be explained further elsewhere in this description.

For example, at least some of the processing may be carried out based on each of the different grids separately, whereafter the results from each grid may be combined, e.g. superimposed, into an overall result of the processing. Such combination may involve converting some or all of the results from each grid to a common grid. The common grid may for example correspond to one of the different grids, or to a cartesian grid. Thus, a result of the processing based on the at least one predetermined virtual grid may subsequently be converted, in particular interpolated, to a result expressed in a rectangular grid, in particular a cartesian grid.

Optionally, the at least one virtual grid comprises a virtual grid of which the respective grid lines have a common intersection zone, for example a common intersection point, which is outside, in particular spaced apart from, a region where the plurality of ultrasound receivers and/or the at least first ultrasound transmitter are acoustically coupled to the proximal surface.

Advantageously, in this way, the improved processing can accommodate a wide variety of ultrasound travel paths, including where one or more reflections occur at a boundary of the object, and/or where the receivers are substantially spaced apart from the at least first transmitter.

If the at least one virtual grid comprises a plurality of grids, the common intersection zone or point may be different for multiple, e.g. each, of the different grids.

Such a common intersection zone or point may be at or adjacent the proximal surface of the object.

With respect to the area of interest, such a common intersection zone or point may be beyond where the plurality of ultrasound receivers and/or the at least first ultrasound transmitter are acoustically coupled to the proximal surface.

If the object is provided with at least one predetermined reflection surface, such a common intersection zone or point may be at or adjacent the at least one predetermined reflection surface. Alternatively or additionally, with respect to the proximal surface of the object, such a common intersection zone or point may be beyond the at least one predetermined reflection surface.

A common intersection zone or point may be inside the object. Alternatively or additionally, a common intersection zone or point may be outside the object, in particular at a same side of the proximal surface of the object as the plurality of ultrasound receivers and/or the at least first ultrasound transmitter.

The area of interest may define a range along the outside surface and/or along the at least one predetermined reflection surface. A common intersection zone or point may then be outside said range, in particular at a same side thereof as the plurality of ultrasound receivers and/or the at least first ultrasound transmitter. Alternatively or additionally, a common intersection zone or point may be within said range, preferably centrally therewithin.

Alternatively or additionally, a common intersection zone or point may be in a region where the plurality of ultrasound receivers and/or the at least first ultrasound transmitter are acoustically coupled to the proximal surface, in particular centrally with respect to said region.

The at least one virtual grid of positions may be predetermined in various ways, for example based on one or more of the following: one or more properties, in particular one or more positions, of the predetermined area of interest; a predetermined spacing, e.g. angular spacing, between the grid lines; a predetermined spacing between the positions along the grid lines; a position of the at least first ultrasound transmitter; a position of the plurality of ultrasound receivers; a position of a reflection surface of the object; a frequency and/or wavelength of the at least first ultrasound signal; a sound velocity of the interior material of the object; and a sound velocity of a material which is present between the interior material of the object on the one hand and one or more of the at least first ultrasound transmitter and the plurality of ultrasound receivers on the other hand.

Optionally, the at least one virtual grid of positions is predetermined based on an estimate of a spatial gradient of ultrasound travel time from the at least first ultrasound transmitter to one or more of the plurality of ultrasound receivers. Said estimate may be based on at least one of: a numerical approximation of said gradient based on a calculation of ultrasound travel times at different positions in the local area of the gradient to be estimated; and directions of ultrasound travel paths from the at least first ultrasound transmitter to the local area of the gradient and from said local area to the plurality of ultrasound receivers. Advantageously, such a virtual grid can be used in combination with optional wave mode conversion in the area of interest, e.g. at a defect in the material there, or at a reflection surface. For more information on wave mode conversion, the reader is referred to WO2018/208151.

Thus, the method may comprise estimating such a spatial gradient of ultrasound travel time. In some examples, to simplify calculations, the center of an array formed by the ultrasound receivers is used as a reference position for estimating the aforementioned gradient with respect to several, e.g. each, of the receivers. Alternatively, for example, respective different positions of the different receivers may be taken into account.

As briefly alluded to above, a particular grid of the at least one virtual grid may correspond to travel time gradients associated with a particular possible travel path of the ultrasound signal between the at least first transmitter and the plurality of receivers. Such a travel path may in particular be associated with particular reflections, or lack thereof, of the ultrasound signal, in particular at one or more boundaries of the material or at one or more other reflection surfaces.

For example, if the object is provided with at least one predetermined reflection surface, then if in step b. ultrasound is received due to reflections and/or diffractions at a first predetermined position at least a portion of the received signal may not have reflected within the object on the at least one predetermined reflection surface.

Alternatively or additionally, if in step b. ultrasound is received due to reflections and/or diffractions at the first predetermined position of the ultrasound transmitted in step a. at least a portion of the received signal has reflected within the object on the at least one predetermined reflection surface before the ultrasound signal has reached the predetermined position.

Alternatively or additionally, if in step b. ultrasound is received due to reflections and/or diffractions at the first predetermined position of the ultrasound transmitted in step a. at least a portion of the received signal has reflected within the object on the at least one predetermined reflection surface after the ultrasound signal has reached the first predetermined position.

In step c. the receiving signals are preferably processed according to different modes respectively wherein each mode of said modes is determined by whether or not and if so which at least one reflection on the at least one predetermined reflection surface is taken into account so that the same receiving signals are used to process the receiving signals according to different modes respectively.

The processing according to different modes may in particular comprise using a different grid of the at least one virtual grid, depending on the mode.

Preferably, in step c. the receiving signals are processed according to multiple of the different modes, in particular using a different virtual grid for each of the different modes.

The respective results of the processing according to the different modes may subsequently be combined, in particular superimposed, into an overall result. Such superposition may in particular involve taking a maximum amplitude value from across different modes (e.g. as opposed to a summation of such amplitude values).

Using the virtual grid as described herein can provide the advantage that, based on the regions that can be covered acoustically, only the relevant parts can be included in the image calculation. The virtual grid can be designed in such a way that one direction is aligned with the direction of increasing travel time, and the other with angular changes. This approach enables the usage of different sampling densities in these two directions.

When using the virtual grid for Inverse Wave field Extrapolation and using a different virtual grid for each of the different modes, the number of positions in the virtual grid can be optimized for each particular mode. Due to the fact that the resolution is typically significantly lower in the direction which is transverse to the travel time gradient (e.g. the angular direction in case of grid lines with a common intersection point or zone), the number of positions, and hence processing requirements, can be reduced. Depending on the mode(s) used, this can reduce the number of positions in the virtual grid for Inverse Wave field Extrapolation to 10 to 50% in comparison to a full Cartesian grid. This reduction can have a positive effect on both the acquisition and subsequent processing (increased speed), the storage of raw scan data (reduced volume) and the inverse calculation (less positions). The post-processing filters, such as band-pass, rectification, and thinning, can be applied in the depth direction only. This simplifies the processing chain and enables acceleration of this part as well.

It will be appreciated that the at least one virtual grid may be determined beforehand, i.e. prior to transmitting and receiving the ultrasound signals, hence the data collecting and processing can be performed at a high rate.

It will be appreciated that a mutual distance between positions in the at least one virtual grid can be optimized according to requirements of the object under study.

A further aspect provides a system for carrying out the method described herein. The system comprises a group of transmitters, a group of receivers and a controller communicatively connected to the group of transmitters and the group of receivers, wherein the controller is configured to carry out step c. of the method.

Optionally, the controller is also configured to carry out step a. and/or step b. of the method.

The system may further comprise a user interface configured to obtain user input from a user, wherein the predetermining of the at least one virtual grid of positions is at least partly based on the user input.

A further aspect provides use of the system described herein for carrying out a method described herein.

It will be appreciated that all features and options mentioned in view of the method apply equally to the system and use, and vice versa. It will also be clear that any one or more of the above aspects, features and options can be combined.

BRIEF DESCRIPTION OF THE DRAWING

In the following detailed description, the invention will be explained using exemplary embodiments which are shown in the drawing. The drawing is schematic and merely shows examples. In particular, any absolute dimensions indicated therein are merely exemplary. In the drawing, corresponding elements have been provided with corresponding reference signs. In the drawing.

DETAILED DESCRIPTION

The figures variously illustrate a method for examining the interior material of an object 1 from a proximal surface 2A of the object 1 using ultrasound.

The method comprises, as a step a., transmitting at least a first ultrasound signal by at least a first ultrasound transmitter of a predetermined group 3 of ultrasound transmitters, acoustically coupled to the proximal surface 2A of the object 1, to the interior material of the object 1, wherein in the interior material of the object 1 reflections and/or diffractions of the first ultrasound signal occur.

The method comprises, as a step b., receiving reflections and/or diffractions of the first ultrasound signal from the interior material of the object 1 using a plurality of ultrasound receivers of a predetermined group 4 of ultrasound receivers which plurality of ultrasound receivers are acoustically coupled to the proximal surface 2A of the object 1 at positions 5 which are distributed in at least one dimension of the proximal surface 2A of the object 1, wherein, with each of the plurality of ultrasound receivers, a receiving signal is generated from the received reflections and/or diffractions of the at least first ultrasound signal from the interior material of the object 1.

The method comprises, as a step c., processing in combination the receiving signals generated by the plurality of the ultrasound receivers in order to determine, according to the principle of inverse wave field extrapolation, where in the interior material of the object 1 reflections and/or diffractions of the transmitted first ultrasound signal occurred.

Figure 15A:
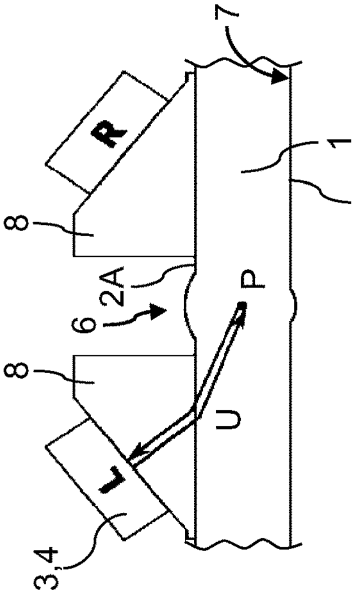
FIGS. 15*a* to 15*f* illustrate different possible ultrasound travel paths in the context of one or two arrays of ultrasound receivers/transmitters.
Figure 15B:
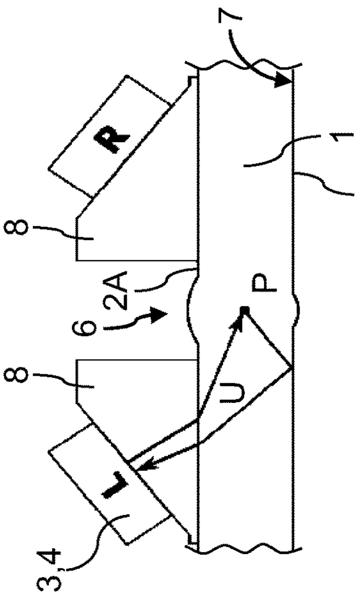

The object 1 may be provided with at least one predetermined reflection surface 7. If in step b. ultrasound is received at the receivers 4 due to reflections and/or diffractions at a first predetermined position P at least a portion of the received signal may not have reflected within the object 1 on the at least one predetermined reflection surface 7, as illustrated in FIGS. 15*a* and 15*e*.

Figure 15C:
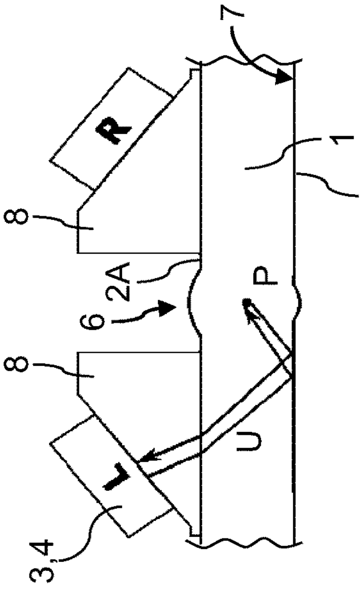
Figure 15D:
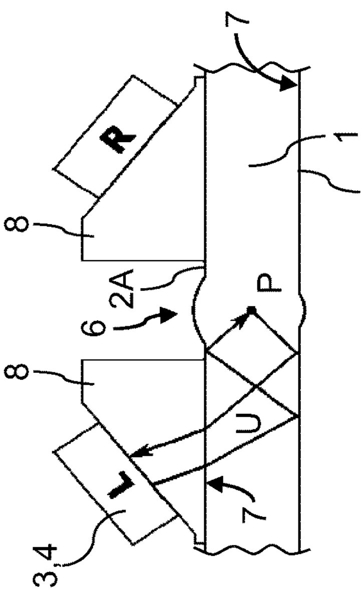
Figure 15E:
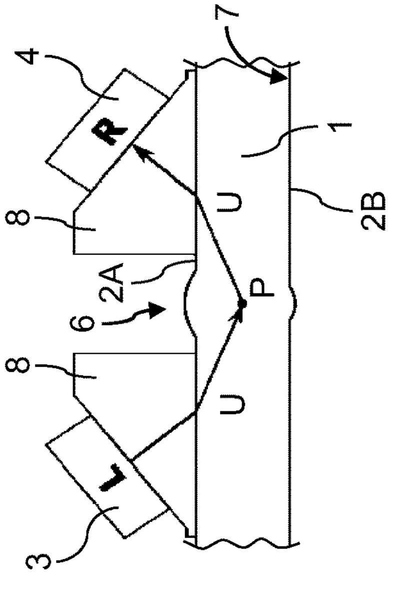
Figure 15F:
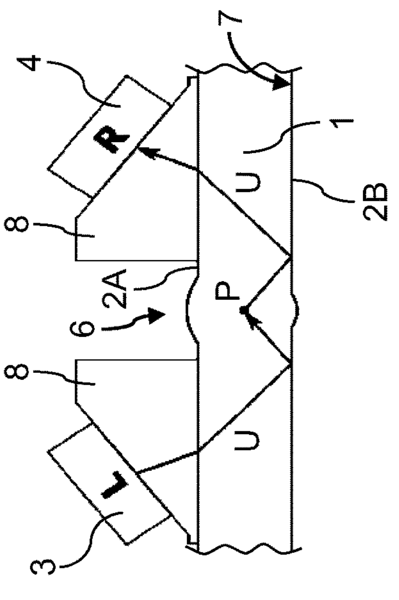

Alternatively or additionally, if in step b. ultrasound is received due to reflections and/or diffractions at the first predetermined position P of the ultrasound transmitted in step a. at least a portion of the received signal may have reflected within the object 1 on the at least one predetermined reflection surface 7 before the ultrasound signal has reached the predetermined position P, as illustrated in FIGS. 15*c*, 15*d* and 15*f*.

Alternatively or additionally, if in step b. ultrasound is received due to reflections and/or diffractions at the first predetermined position of the ultrasound transmitted in step a. at least a portion of the received signal may have reflected within the object 1 on the at least one predetermined reflection surface 7 after the ultrasound signal has reached the first predetermined position P, as illustrated in FIGS. 15*b*, 15*c*, 15*d* and 15*f*.

With respect to FIGS. 15*b* and 15*d*, it shall be understood that the ultrasound signal may alternatively or additionally travel in opposite directions from the directions indicated by the arrows U.

In step c. the receiving signals may be processed according to different modes respectively, wherein each mode of said modes is determined by whether or not and if so which at least one reflection on the at least one predetermined reflection surface 7 is taken into account so that the same receiving signals are used to process the receiving signals according to different modes respectively.

In step c. the receiving signals are preferably processed according to different modes respectively, as e.g. shown in FIGS. 15*a*-15*f*, wherein each mode of said modes is determined by whether or not and if so which at least one reflection on the at least one predetermined reflection surface 7 is taken into account so that the same receiving signals are used to process the receiving signals according to different modes respectively.

The processing is based on at least one predetermined virtual grid 100-108 of positions at a predetermined area of interest 6 which includes a part of the interior material of the object 1. Each grid 100-108 of the at least one virtual grid 100-108 is defined along a series of grid lines which extend along respective directions, which generally may or may not be mutually parallel directions. At least a first one of the respective directions corresponds to an at least approximate local direction of a spatial gradient of ultrasound travel time from the at least first ultrasound transmitter to one or more of the plurality of ultrasound receivers. It will be appreciated that the local spatial gradient of ultrasound travel time from the at least first ultrasound transmitter to one or more of the plurality of ultrasound receivers may vary for the various modes.

Figure 1:
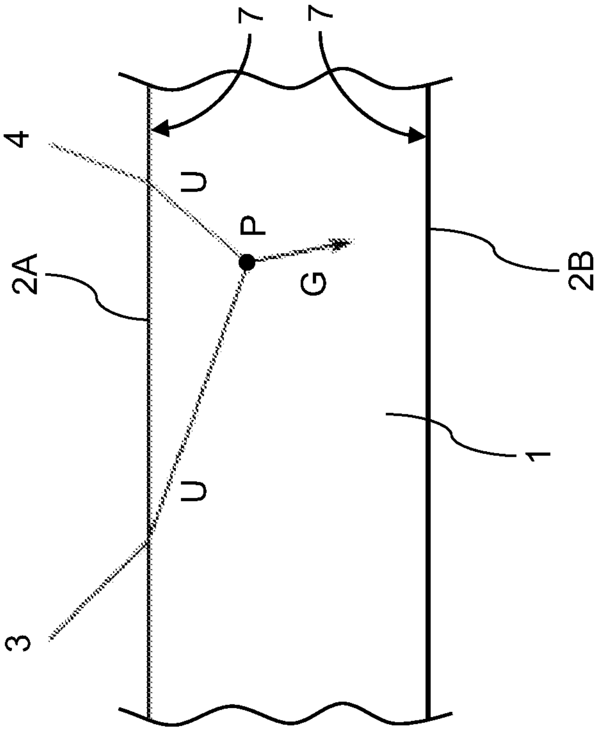
FIG. 1 shows an illustration of a spatial gradient of ultrasound travel time.

With reference to FIG. 1, ultrasound travel time generally depends on various factors including material-dependent sound velocity, geometries, and travel path. FIG. 1 illustrates such a local gradient G in the context of an ultrasound U signal traveling between a transmitter 3 and a receiver 4 along a travel path via a position P within the object 1. Here, since the sound velocity is substantially constant throughout the object, the travel time between 3 and 4 increases along with the travel path in dependence of the position P according to the indicated local gradient G, wherein the local gradient G indicates the direction of steepest change in travel time at the position P.

The at least one virtual grid of positions 100-108 may be predetermined based on an estimate of a spatial gradient G of ultrasound travel time from the at least first ultrasound transmitter 3 to one or more of the plurality of ultrasound receivers 4. Such an estimate may be based on at least one of: a numerical approximation of said gradient G based on a calculation of ultrasound travel times at different positions in the local area of the gradient G to be estimated; and directions of ultrasound travel paths from the at least first ultrasound transmitter 3 to the local area of the gradient G and from said local area to the plurality of ultrasound receivers 4.

Figure 2:
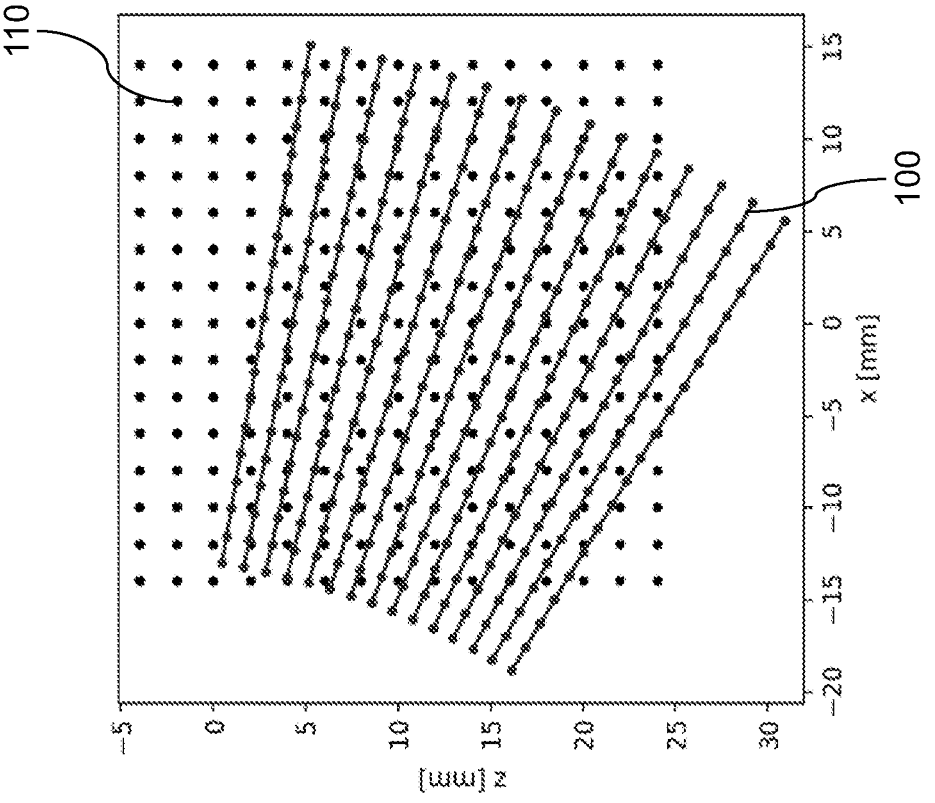
FIG. 2 shows a virtual grid of positions defined along a series of non-parallel lines and a cartesian grid of positions at the same area.

FIG. 2 shows one example of such a virtual grid 100 of positions, here shown as non-parallel grid lines on which positions are indicated by points. For comparison, an exemplary cartesian grid 110 at the same area is shown as non-connected points. It is noted that grid lines may alternatively or additionally be parallel, for example for one or more virtual grids of the at least one virtual grid, as will be explained further herein with reference to FIG. 17. Thus, in the present context, the term grid encompasses various types of grids, including rectilinear grids and curvilinear grids. Also, as alluded to elsewhere herein, aspects of the grids such as spacing among grid lines and spacing of grid positions along grid lines may generally be regular or irregular.

Preferably, the at least one predetermined virtual grid 100-108 comprises a plurality of mutually different predetermined virtual grids 100-108, in particular with different grid lines for each of the different grids 100-108. FIGS. 3, 5, 7, 9, 11, 13, 16 and 17 show examples of such different grids 101-108.

If the receiving signals are processed according to multiple of the above described different modes, a different virtual grid 100-108 of the at least one virtual grid 100-108 may be used for each of the different modes. The respective results of the processing according to the different modes may subsequently be combined, in particular superimposed, into an overall result. To that end, and/or for example for display purposes, a result of the processing based on the at least one predetermined virtual grid 100-108 may subsequently be converted, in particular interpolated, e.g. for easy display on a display screen, to a result expressed in a rectangular grid, in particular a cartesian grid 110, of which one example is shown in FIG. 2.

Figure 9:
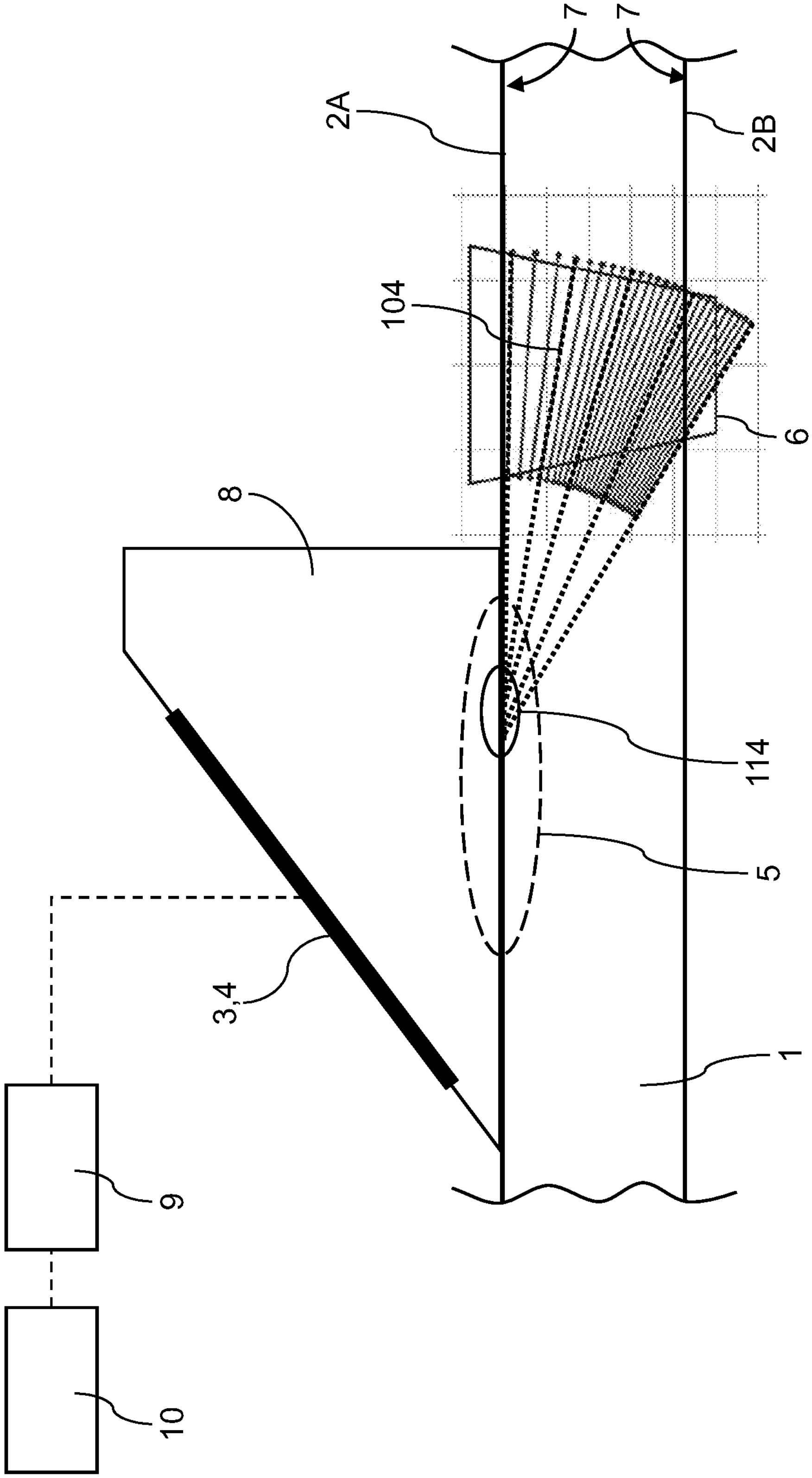
FIG. 9 shows an example of a virtual grid in the context of an area of interest and an array of ultrasound transmitters/receivers.

As shown in FIG. 9, the at least one virtual grid 100-108 may comprise a virtual grid 104 of which the respective grid lines have a common intersection zone 114 at the proximal surface 2A of the object, wherein the common intersection zone 114 is in a region 5 where the plurality of ultrasound receivers 4 and/or the at least first ultrasound transmitter 3 are acoustically coupled to the proximal surface 2A, for instance centrally with respect to said region 5. Such a region 5 has been indicated approximately by a dashed ellipse 5.

Such a virtual grid 104 can be particularly suitable in a processing a mode which is illustrated in FIG. 15*a*, wherein the relevant transmitters 3 and receivers 4 are in a same array L and possible reflections at predetermined reflection surfaces 7 are not taken into account.

Figure 10B:
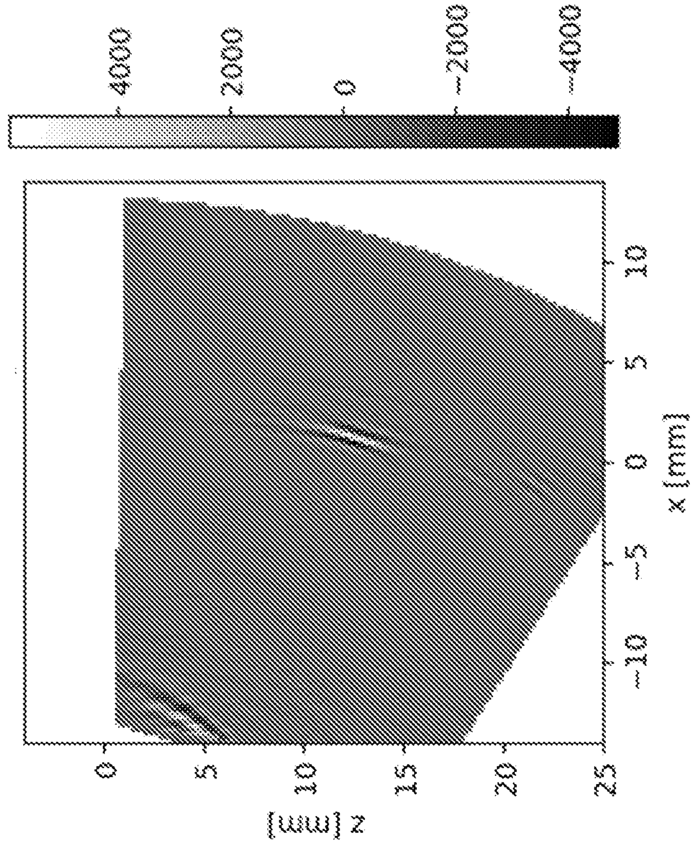
FIG. 10*b* shows a processing result using the same receiving signals as in FIG. 10*a* but based on the virtual grid of FIG. 9.
Figure 10A:
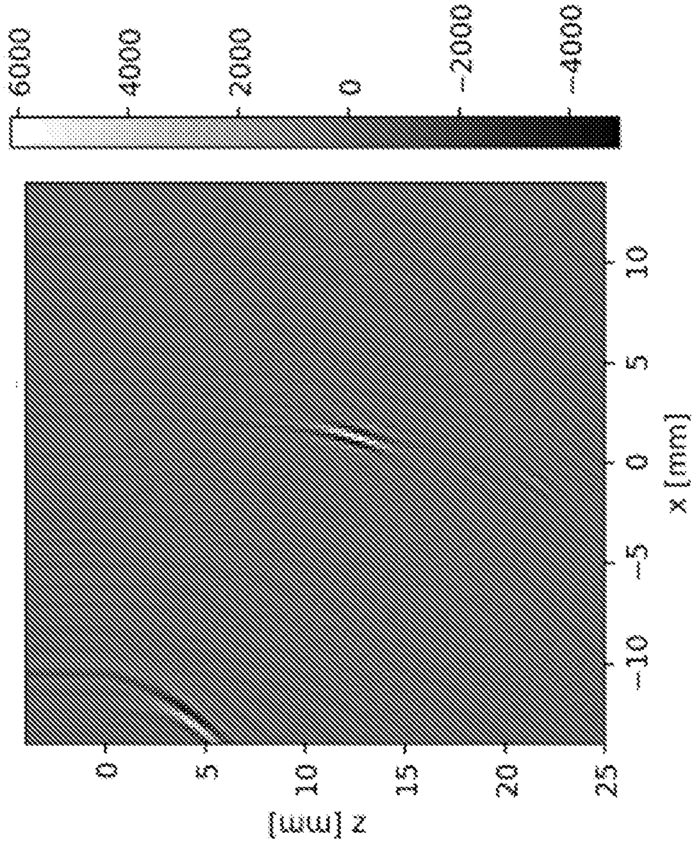
FIG. 10*a* shows a processing result based on a cartesian grid.

FIG. 10*b* shows an exemplary processing result obtained using such a virtual grid 104, in such a processing mode. FIG. 10*a* shows a processing result obtained from the same receiving signals in the same processing mode but using a conventional cartesian grid instead. It can be seen that essentially the same relevant information can be reproduced with both grids. Meanwhile, as explained, the processing can be more efficient using the virtual grid 104 compared to the cartesian grid.

With reference to FIGS. 3, 5, 7, 11, 13 and 16, the at least one virtual grid 100-108 may additionally or alternatively comprise one or more virtual grids 101, 102, 103, 105, 106, 107 of which the respective non-parallel lines have a common intersection zone 111, 112, 113, 115, 116, 117 which is outside, in particular spaced apart from, a region 5 where the plurality of ultrasound receivers 4 and/or the at least first ultrasound transmitter 3 are acoustically coupled to the proximal surface 2A.

Such virtual grids 101, 102, 103, 105, 106, 107 can be particularly suitable in other processing modes, some of which are illustrated in FIGS. 15*b*-15*f*, wherein one or more reflections at a predetermined reflection surface 7 are taken into account (FIGS. 15*b-d*, 15*f*), and/or wherein the receivers 4 are in a different array R, at least spaced apart from, the transmitters 3 (FIGS. 15*e-f*). It shall be appreciated that further such processing modes than those shown in FIGS. 15*b-f* are possible, for example one or more processing modes in which more than three reflections are taken into account.

Figure 3:
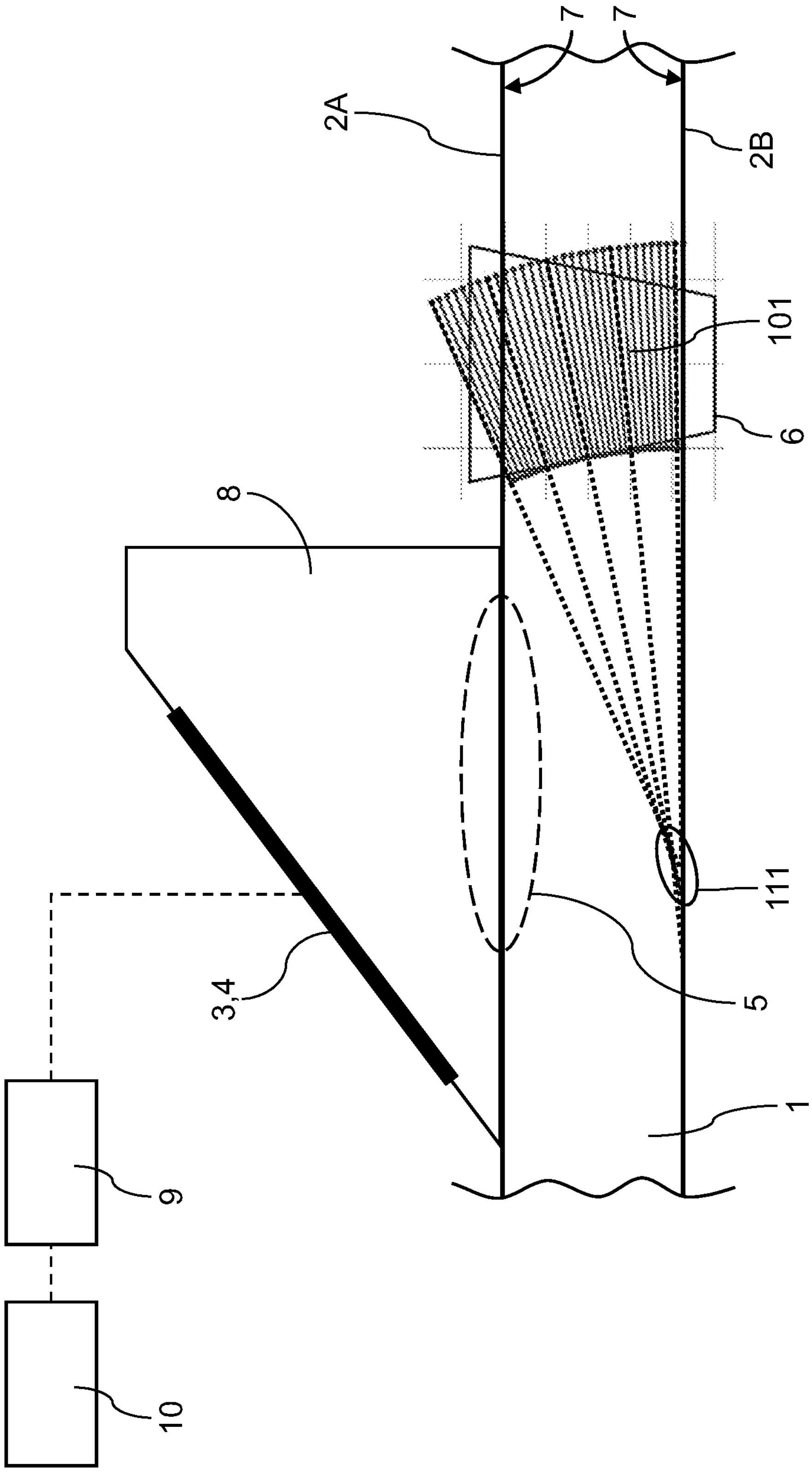
FIG. 3 shows an example of a virtual grid in the context of an area of interest and an array of ultrasound transmitters/receivers.

FIG. 3 shows an example wherein the object 1 is provided with at least one predetermined reflection surface 7, wherein the at least one virtual grid 100-108 comprises a virtual grid 101 of which the respective grid lines have a common intersection zone 111 adjacent the at least one predetermined reflection surface 7, here adjacent the distal surface 2B.

Such a virtual grid 101 can be particularly suitable in a processing mode as illustrated in FIG. 15*b*, wherein the relevant transmitters 3 and receivers 4 are in a same array L, and wherein a reflection at the distal surface 2B is taken into account for ultrasound U traveling from the position P in the area of interest 6 to the receivers 4.

Figure 4B:
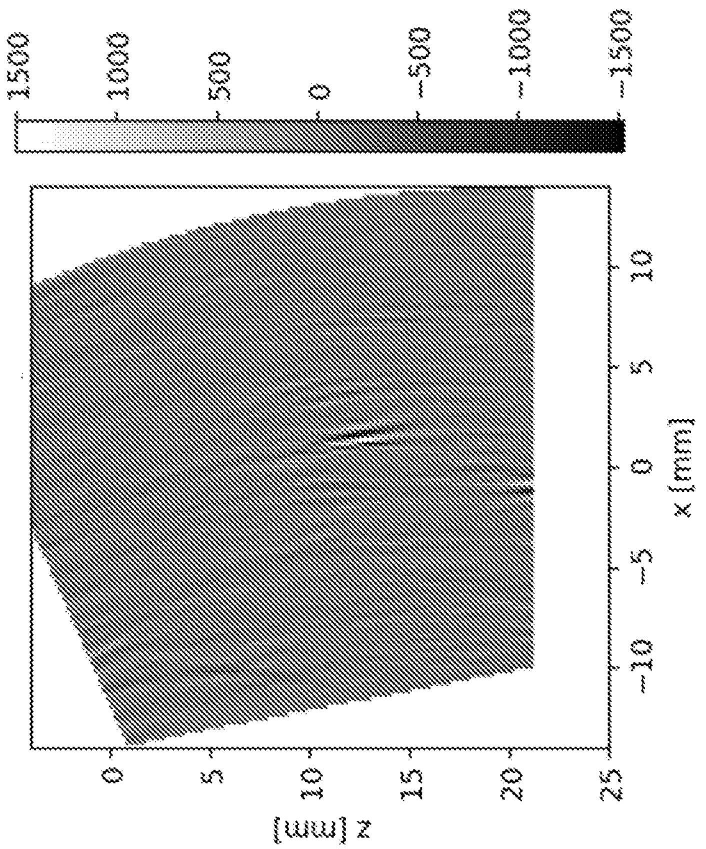
FIG. 4*b* shows a processing result using the same receiving signals as in FIG. 4*a* but based on the virtual grid of FIG. 3.
Figure 4A:
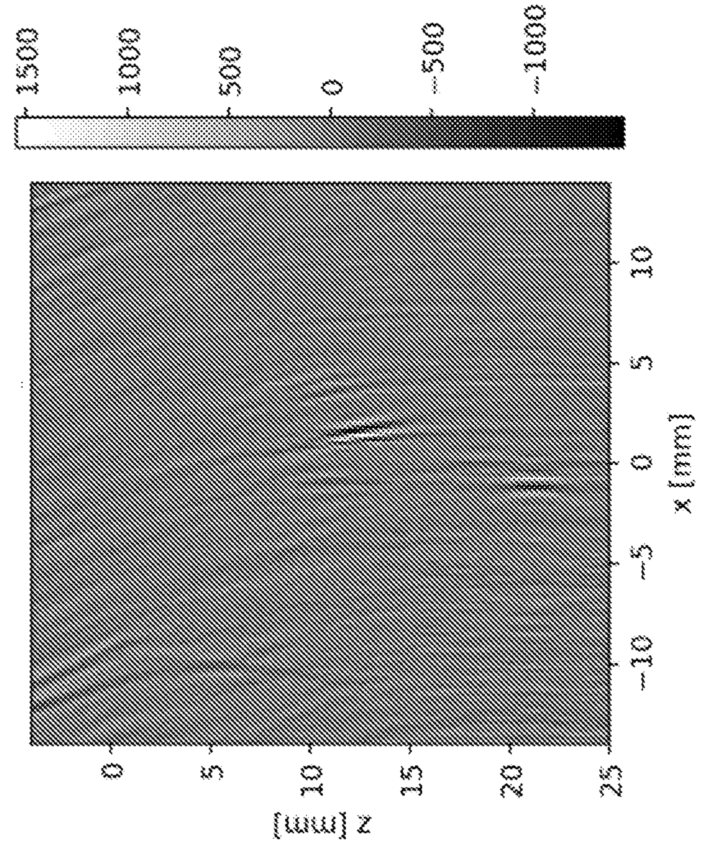
FIG. 4*a* shows a processing result based on a cartesian grid.

FIG. 4*b* shows an exemplary processing result obtained using such a virtual grid 101, in such a processing mode. FIG. 4*a* shows a processing result obtained from the same receiving signals in the same processing mode but using a conventional cartesian grid instead. It can be seen that essentially the same relevant information can be reproduced with both grids. Meanwhile, as explained, the processing can be more efficient using the virtual grid 101 compared to the cartesian grid.

Figure 5:
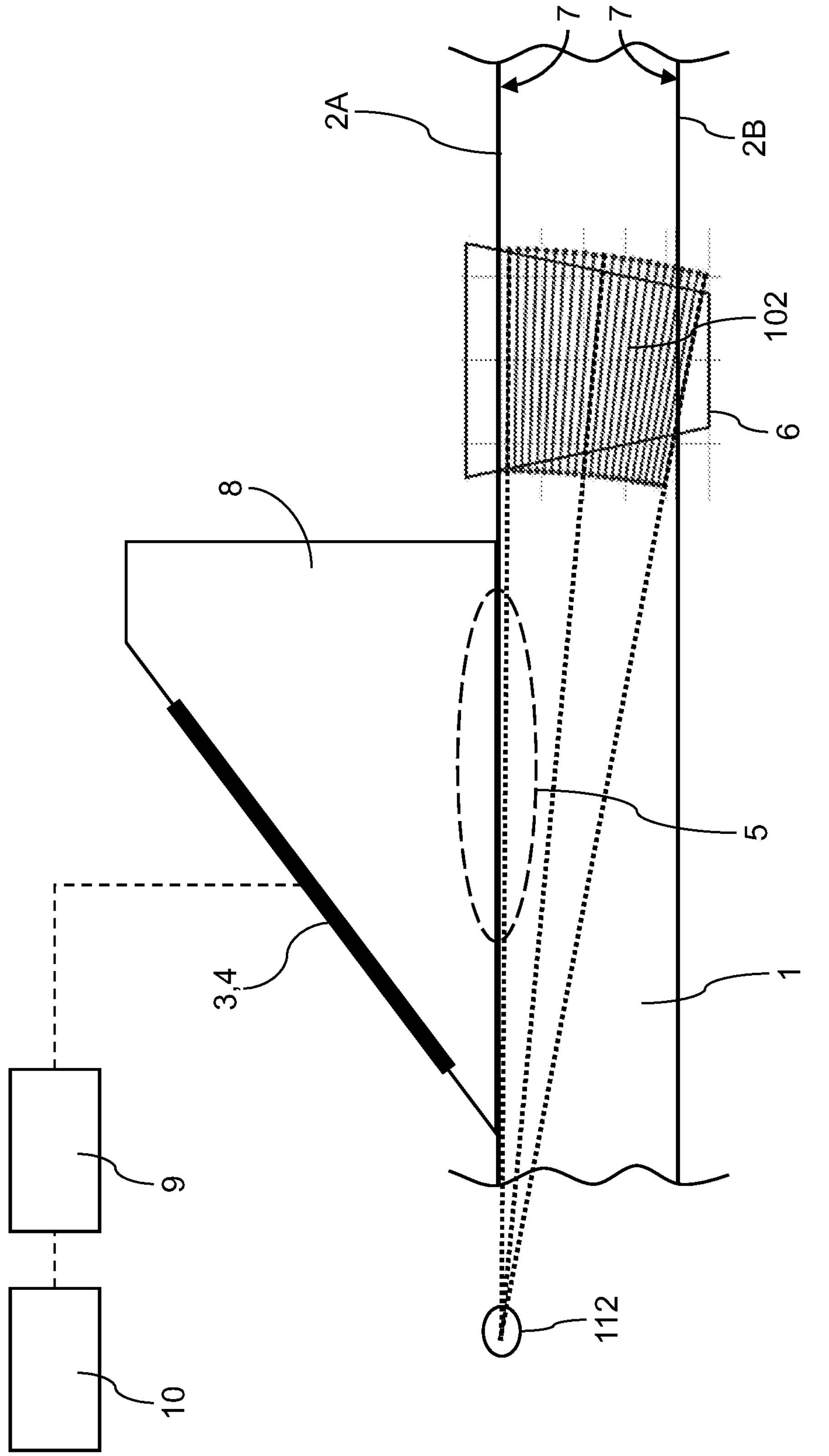
FIG. 5 shows a further example of a virtual grid in the context of an area of interest and an array of ultrasound transmitters/receivers.

FIG. 5 shows an exemplary virtual grid 102 of which the respective grid lines have a common intersection zone 112 at the proximal surface 2A of the object 1, wherein, with respect to the area of interest 6, the common intersection zone 112 is beyond where 5 the plurality of ultrasound receivers 4 and/or the at least first ultrasound transmitter 3 are acoustically coupled to the proximal surface 2A.

Such a virtual grid 102 can be particularly suitable in a processing mode as illustrated in FIG. 15*d*, wherein the relevant transmitters 3 and receivers 4 are in a same array L, wherein a reflection at the distal surface 2B is taken into account for ultrasound U traveling from the position P in the area of interest 6 to the receivers 4, and where reflections at the distal surface 2B and the proximal surface 2A are taken into account for ultrasound U traveling from the transmitters 3 to the position P.

Figure 6B:
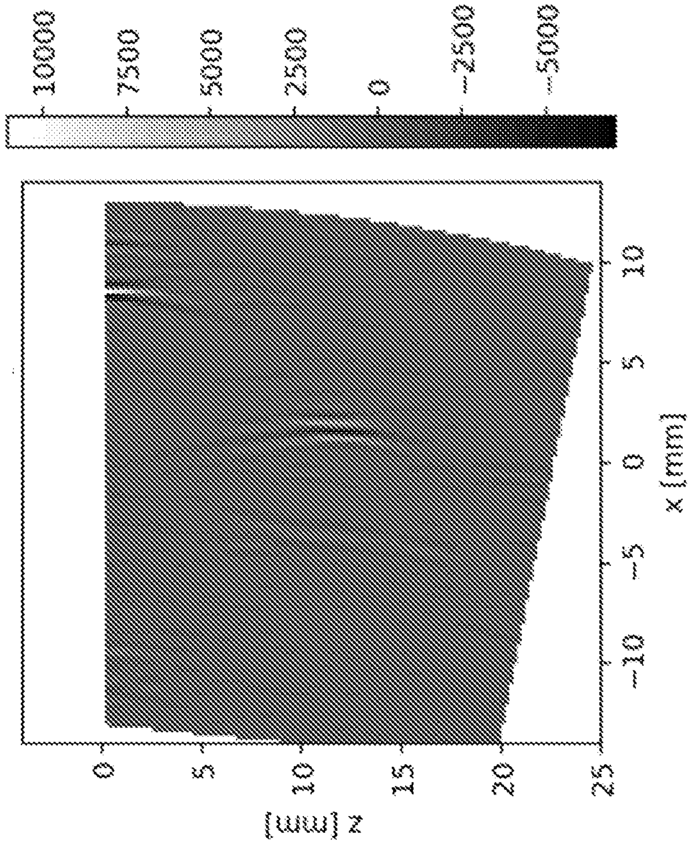
FIG. 6*b* shows a processing result using the same receiving signals as in FIG. 6*a* but based on the virtual grid of FIG. 5.
Figure 6A:
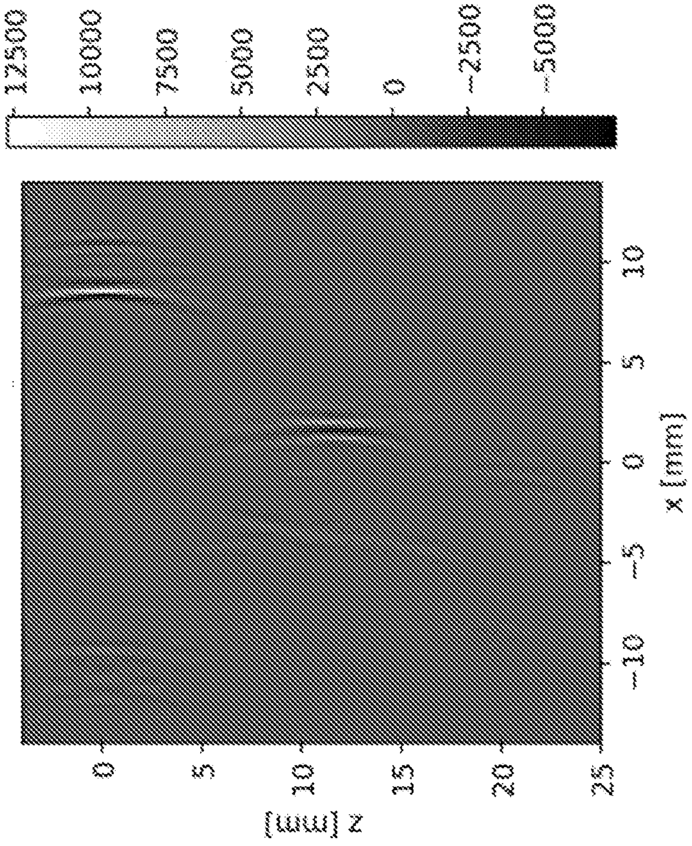
FIG. 6*a* shows a processing result based on a cartesian grid.

FIG. 6*b* shows an exemplary processing result obtained using such a virtual grid 102, in such a processing mode. FIG. 6*a* shows a processing result obtained from the same receiving signals in the same processing mode but using a conventional cartesian grid instead. It can be seen that essentially the same relevant information can be reproduced with both grids. Meanwhile, as explained, the processing can be more efficient using the virtual grid 102 compared to the cartesian grid.

Figure 7:
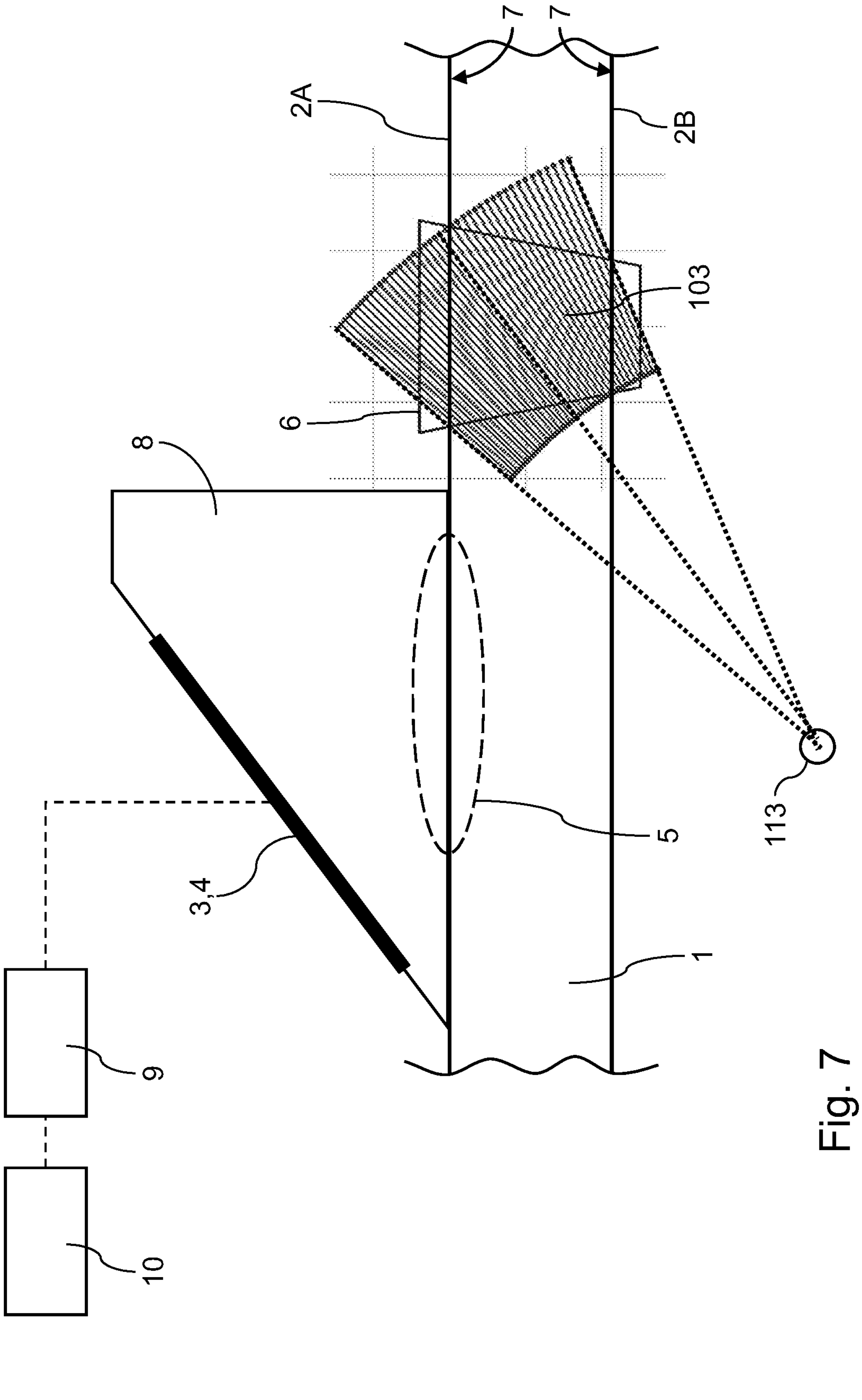
FIG. 7 shows an example of a virtual grid in the context of an area of interest and an array of ultrasound transmitters/receivers.

In the example of FIG. 7, the grid lines of a virtual grid 103 have a common intersection zone 113 which, with respect to the proximal surface 2A of the object 1, is beyond the at least one predetermined reflection surface 7, wherein the area of interest 6 defines a range along the outside surface 2 and/or along the at least one predetermined reflection surface 7, wherein the common intersection zone 113 is outside said range, in particular at a same side thereof as the plurality of ultrasound receivers 4 and/or the at least first ultrasound transmitter 3.

Such a virtual grid 103 can be particularly suitable in a processing mode as illustrated in FIG. 15*c*, wherein the relevant transmitters 3 and receivers 4 are in a same array L, and wherein a respective reflection at the distal surface 2B is taken into account both for the ultrasound U traveling from the transmitters 3 to the position P as well as for the ultrasound U traveling from the position P to the receivers 4.

Figure 8B:
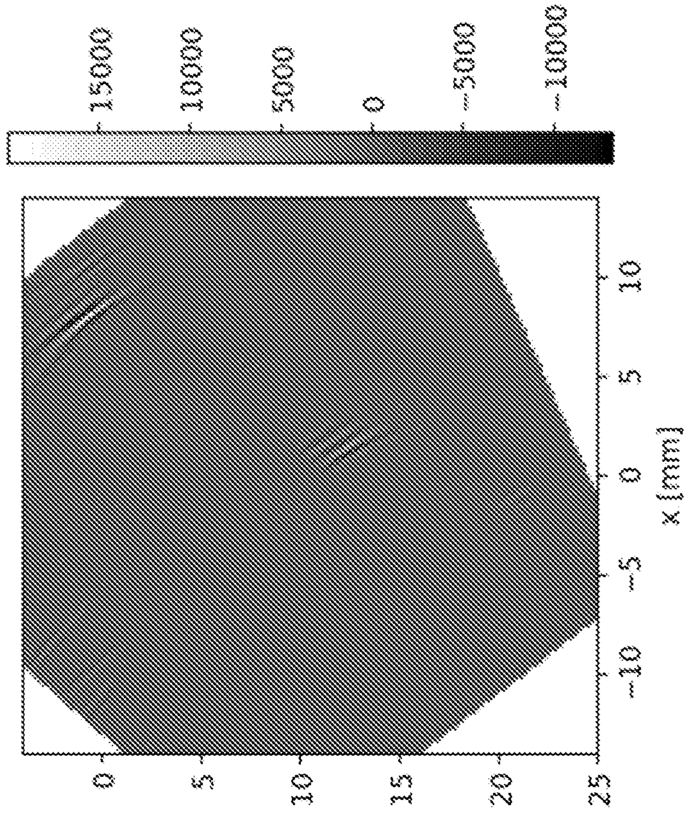
FIG. 8*b* shows a processing result using the same receiving signals as in FIG. 8*a* but based on the virtual grid of FIG. 7.
Figure 8A:
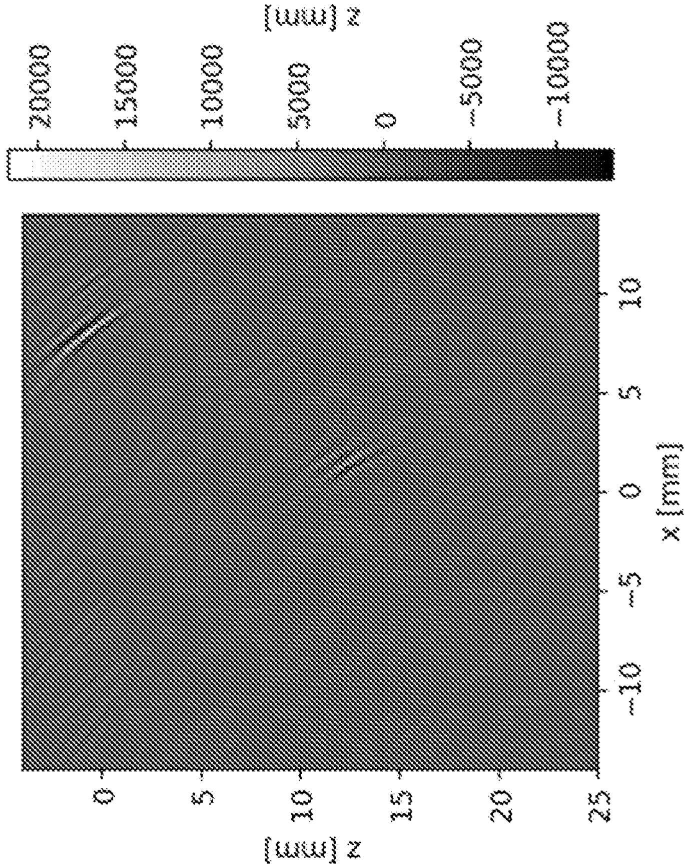
FIG. 8*a* shows a processing result based on a cartesian grid.

FIG. 8*b* shows an exemplary processing result obtained using such a virtual grid 103, in such a processing mode. FIG. 8*a* shows a processing result obtained from the same receiving signals in the same processing mode but using a conventional cartesian grid instead. It can be seen that essentially the same relevant information can be reproduced with both grids. Meanwhile, as explained, the processing can be more efficient using the virtual grid 103 compared to the cartesian grid.

Figure 11:
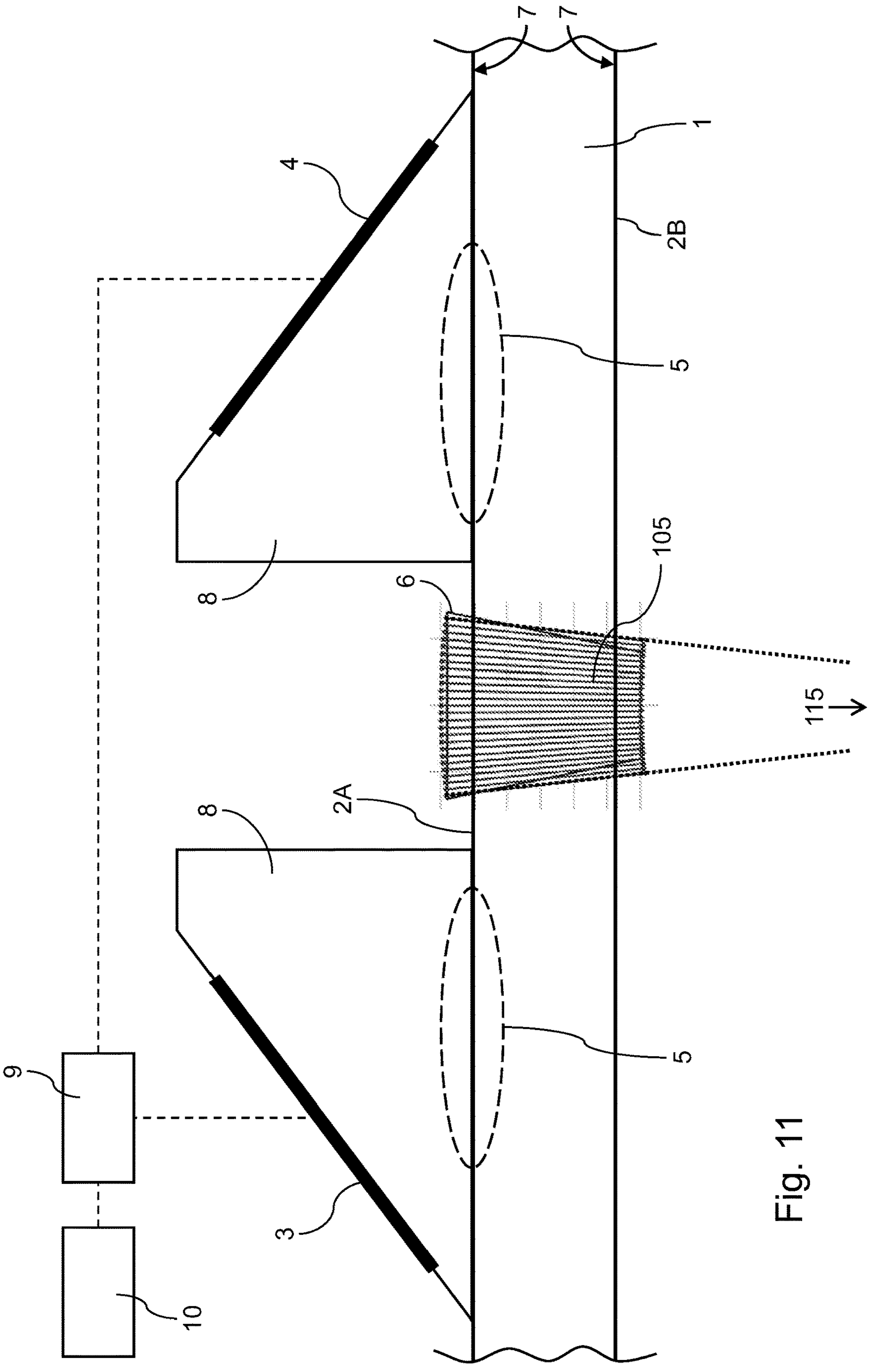
FIG. 11 shows an example of a virtual grid in the context of an area of interest and two arrays of ultrasound transmitters/receivers.

In the example of FIG. 11, the grid lines of a virtual grid 105 have a common intersection zone 115 (located beyond the boundary of the figure in the indicated direction 115), which, with respect to the proximal surface 2A of the object 1, is beyond the at least one predetermined reflection surface or distal surface 2B, wherein the area of interest 6 defines a range along the outside surface 2 and/or along the at least one predetermined reflection surface 7, wherein the common intersection zone 115 is within said range, preferably centrally therewithin.

Such a virtual grid 105 can be particularly suitable in a processing mode as illustrated in FIG. 15*f*, wherein the relevant receivers 4 are in a different array R, at least spaced apart from, the transmitters 3, and wherein a respective reflection at the distal surface 2B is taken into account both for the ultrasound U traveling from the transmitters 3 to the position P as well as for the ultrasound U traveling from the position P to the receivers 4.

Figure 12A:
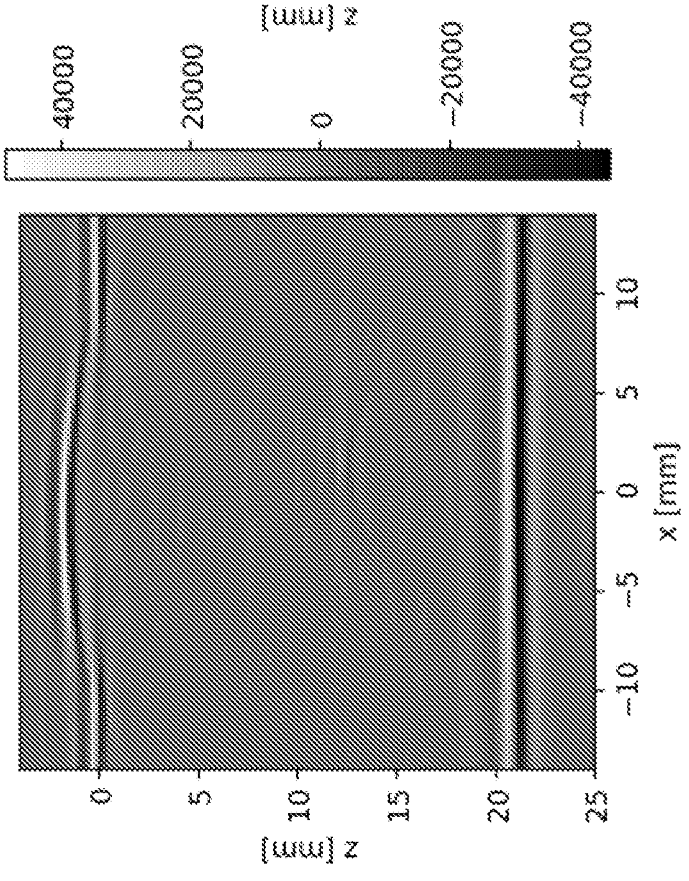
FIG. 12*a* shows a processing result based on a cartesian grid.
Figure 12B:
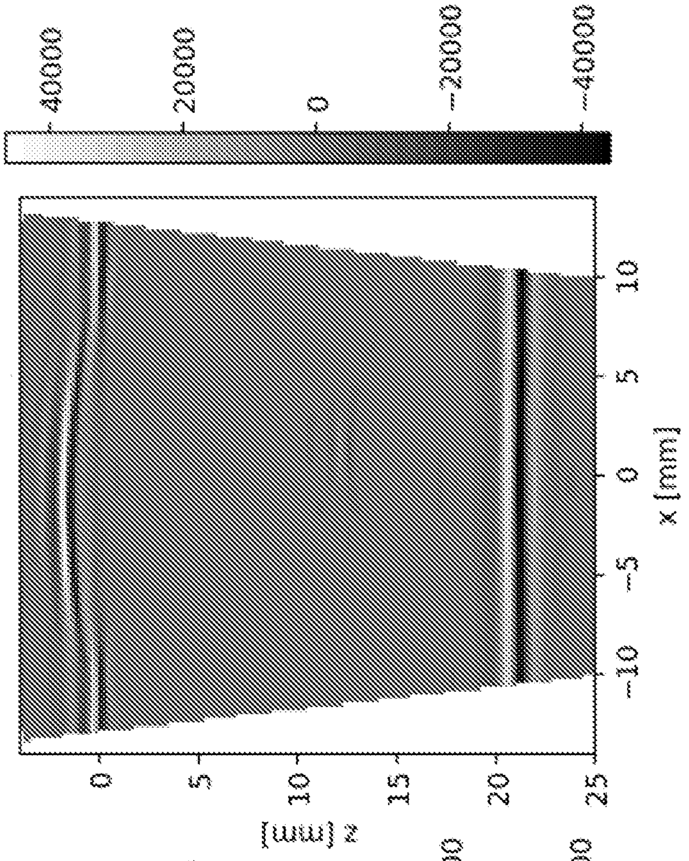
FIG. 12*b* shows a processing result using the same receiving signals as in FIG. 12*a* but based on the virtual grid of FIG. 11.

FIG. 12*b* shows an exemplary processing result obtained using such a virtual grid 105, in such a processing mode. FIG. 12*a* shows a processing result obtained from the same receiving signals in the same processing mode but using a conventional cartesian grid instead. It can be seen that essentially the same relevant information can be reproduced with both grids. Meanwhile, as explained, the processing can be more efficient using the virtual grid 105 compared to the cartesian grid.

Figure 13:
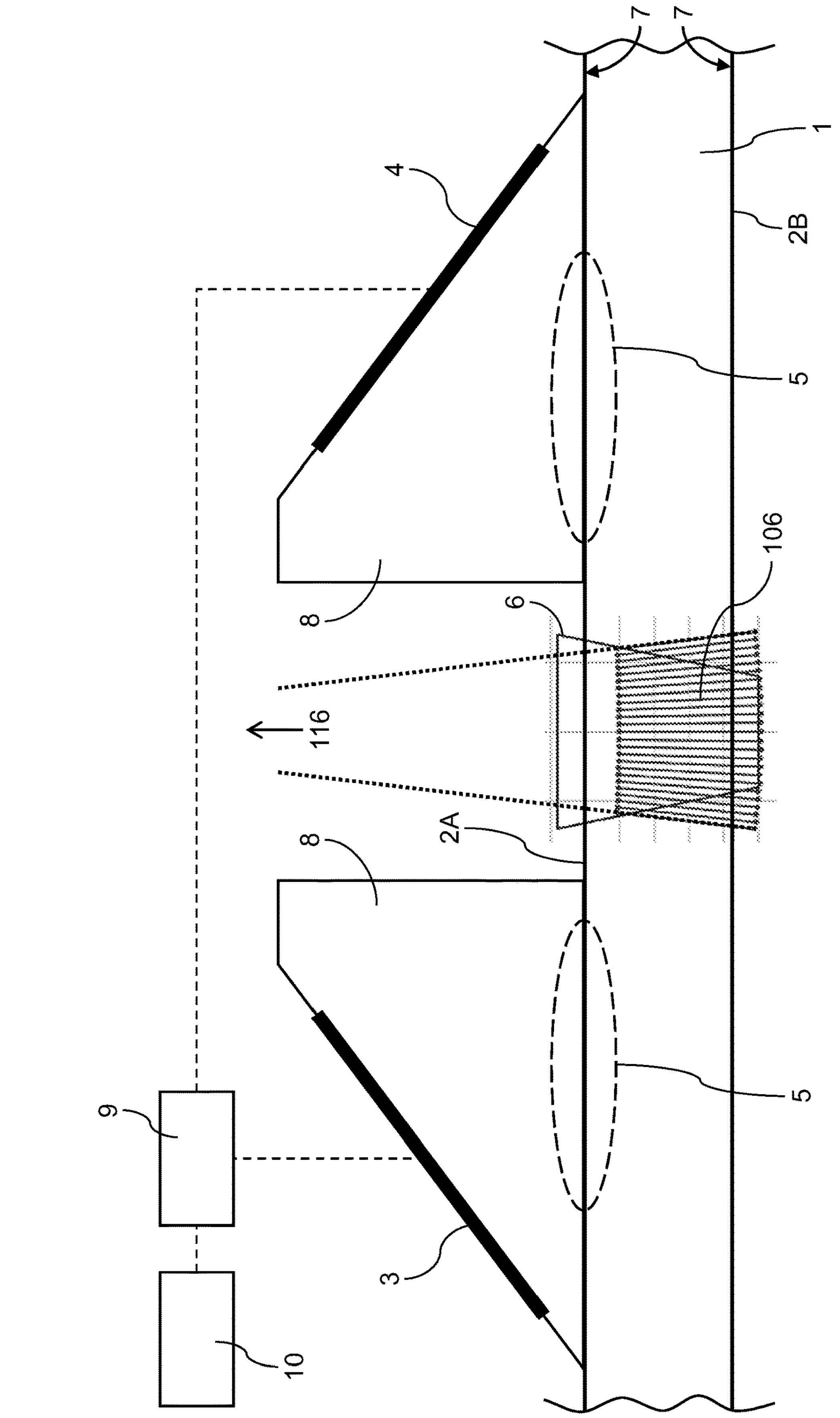
FIG. 13 shows an example of a virtual grid in the context of an area of interest and two arrays of ultrasound transmitters/receivers.

In the example of FIG. 13, the grid lines of a virtual grid 106 have a common intersection zone 116 (located beyond the boundary of the figure in the indicated direction 116) which is outside the object 1, at a same side of the proximal surface 2A of the object 1 as the plurality of ultrasound receivers 4 and/or the at least first ultrasound transmitter 3, wherein the area of interest 6 defines a range along the outside surface 2 and/or along a predetermined reflection surface 7 of the object 1, wherein the common intersection zone 116 is within said range, more preferably centrally therewithin.

Such a virtual grid 106 can be particularly suitable in a processing mode as illustrated in FIG. 15*e*, wherein the relevant receivers 4 are in a different array R, at least spaced apart from, the transmitters 3, and wherein no reflections at predetermined reflection surfaces 7 are taken into account both for the ultrasound U traveling from the transmitters 3 to the position P as well as for the ultrasound U traveling from the position P to the receivers 4.

Figure 14B:
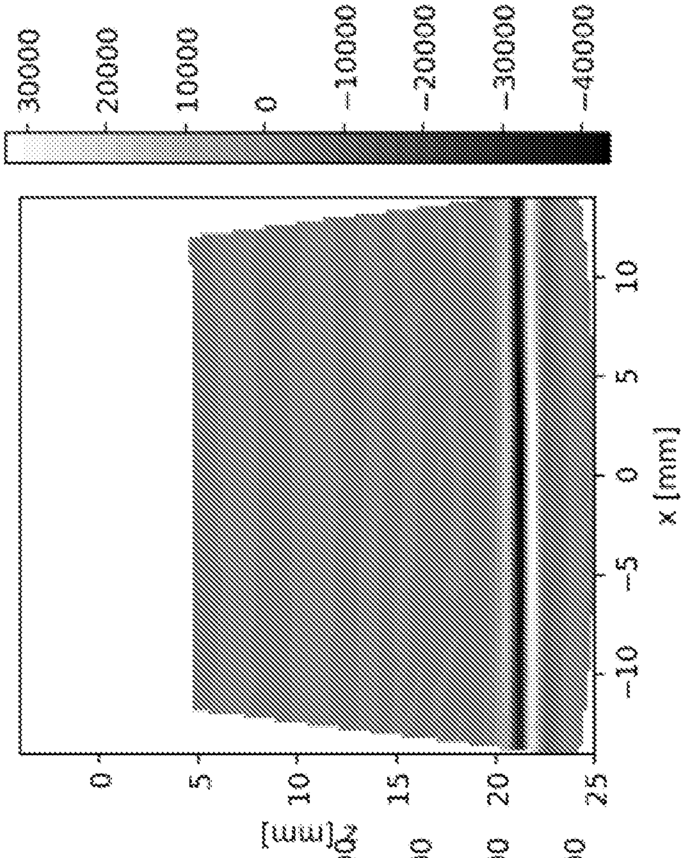
FIG. 14*b* shows a processing result using the same receiving signals as in FIG. 14*a* but based on the virtual grid of FIG. 13.
Figure 14A:
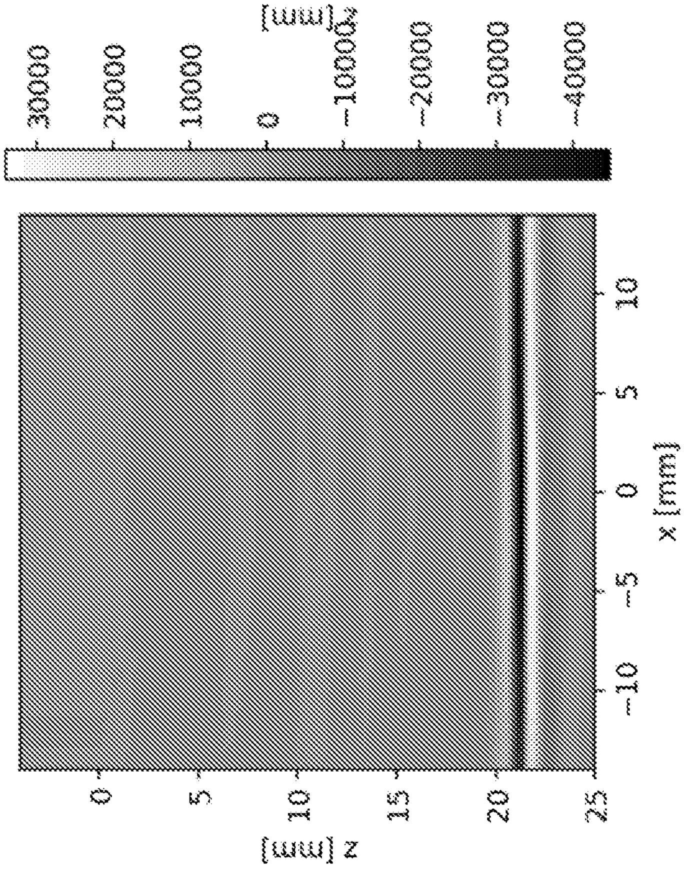
FIG. 14*a* shows a processing result based on a cartesian grid.

FIG. 14*b* shows an exemplary processing result obtained using such a virtual grid 106, in such a processing mode. FIG. 14*a* shows a processing result obtained from the same receiving signals in the same processing mode but using a conventional cartesian grid instead. It can be seen that essentially the same relevant information can be reproduced with both grids. Meanwhile, as explained, the processing can be more efficient using the virtual grid 106 compared to the cartesian grid.

Figure 16:
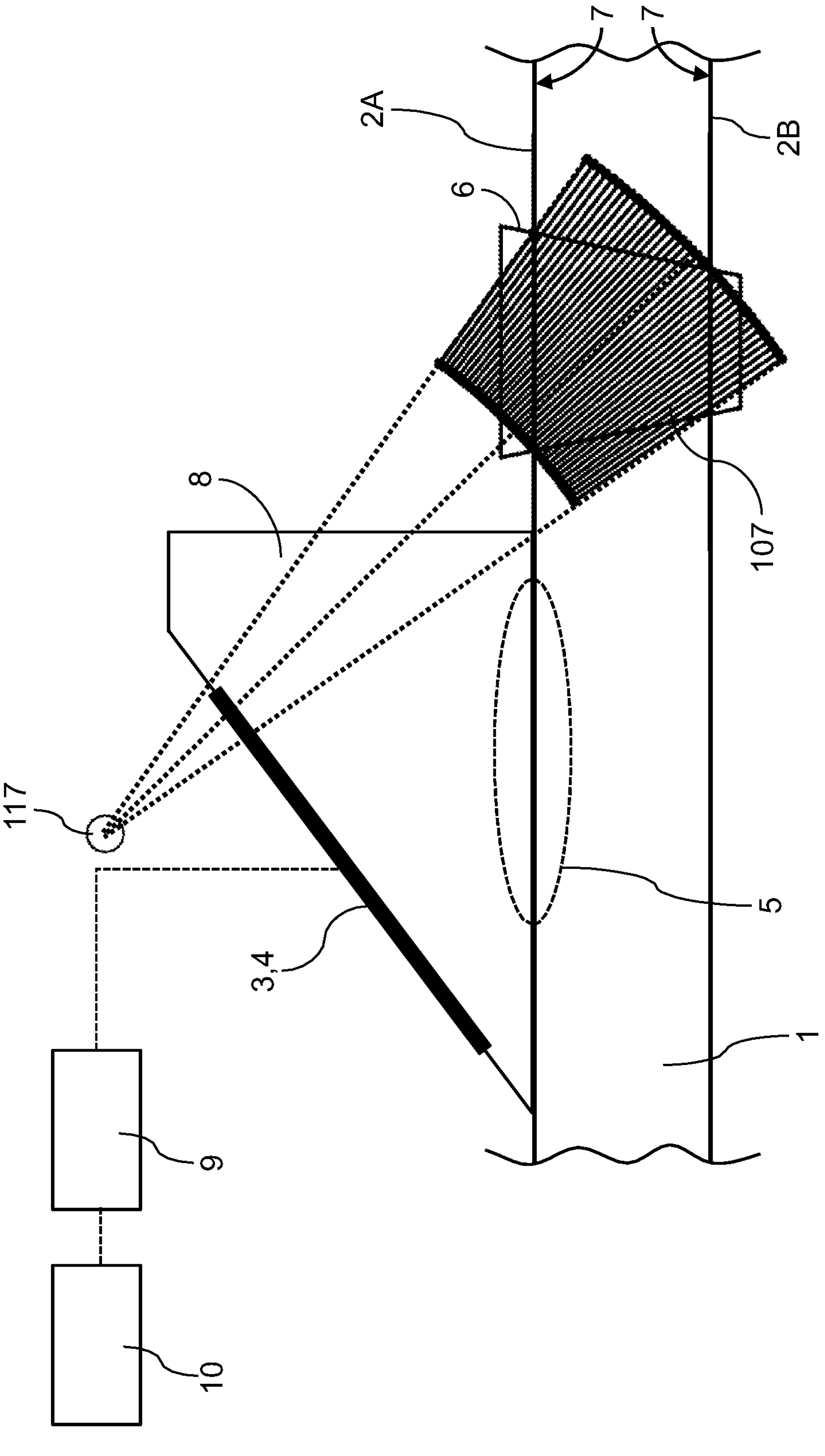
FIG. 16 shows an example of a virtual grid in the context of an area of interest and an array of ultrasound transmitters/receivers.

In the example of FIG. 16, the grid lines of a virtual grid 107 have a common intersection zone 117 which is outside the object 1, at a same side of the proximal surface 2A of the object 1 as the plurality of ultrasound receivers 4 and/or the at least first ultrasound transmitter 3, wherein the area of interest 6 defines a range along the outside surface 2 and/or along the at least one predetermined reflection surface 7 of the object 1, wherein the common intersection zone 117 is outside said range, in particular at a same side thereof as the plurality of ultrasound receivers 4 and/or the at least first ultrasound transmitter 3.

Such a virtual grid 107 can be particularly suitable in a processing mode which is not illustrated in FIGS. 15*a-f*, wherein the relevant transmitters 3 and receivers 4 are in a same array, and wherein more than three, in particular four, reflections are taken into account, more in particular two reflections at each of the surfaces 2A and 2B.

In the exemplary virtual grids 101-107, the respective direction of each of the grid lines advantageously corresponds to a respective at least approximate local direction of the aforementioned spatial gradient of ultrasound travel time, but this is not strictly necessary to enable at least some improvement in processing efficiency, as explained further below.

Figure 17:
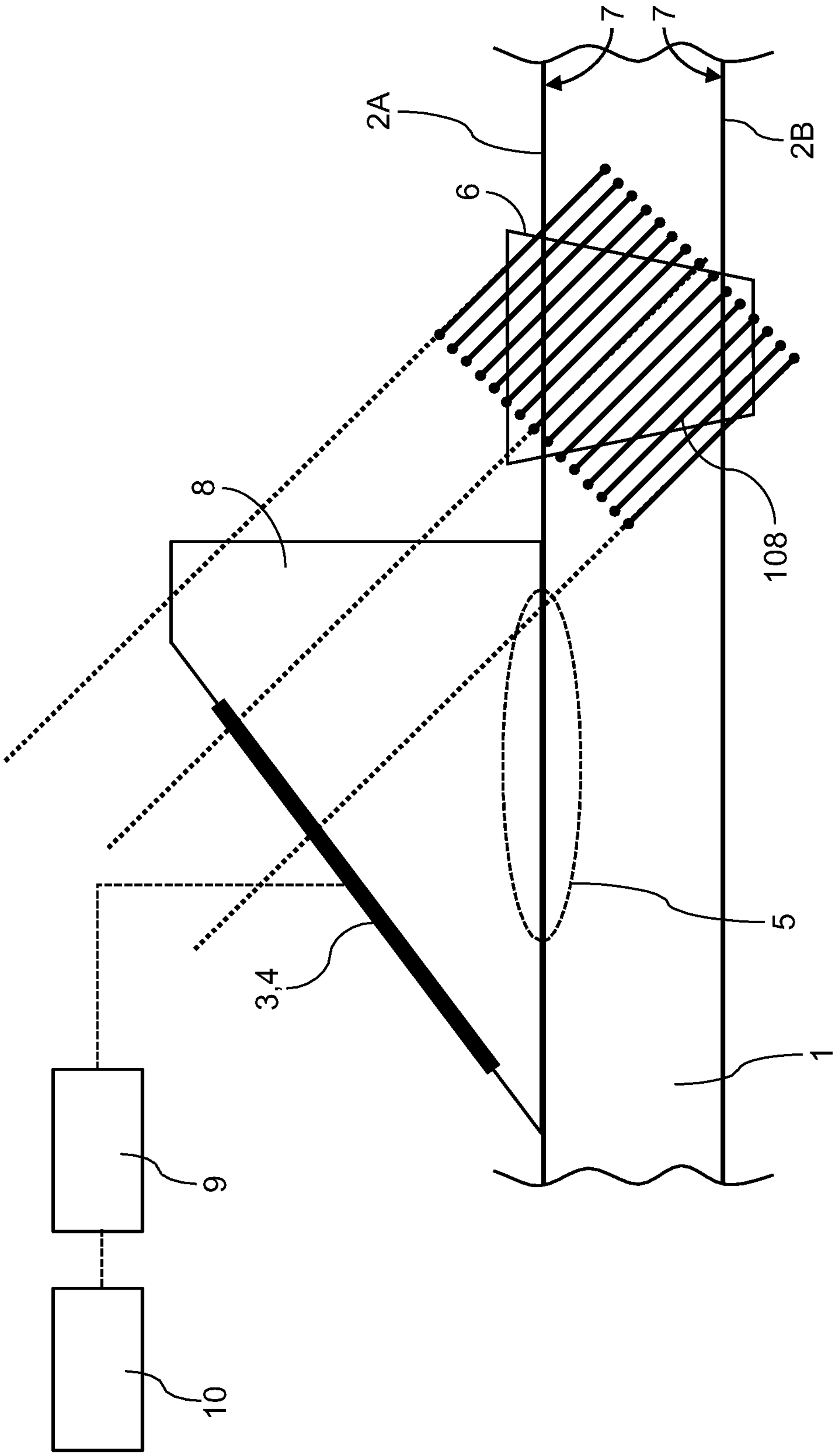
FIG. 17 shows an example of a virtual grid in the context of an area of interest and an array of ultrasound transmitters/receivers.

In an alternative example shown in FIG. 17, the grid lines of the virtual grid 108 are parallel, thus not intersecting at any common intersection point or zone. As explained in the summary section, such parallel grid lines can still provide more efficient processing compared to known methods, in particular when at least one, e.g. a central one, of the grid lines is aligned with a local direction of the travel time gradient. Preferably, also in such a grid with parallel grid lines, the grid positions are spaced closer together along the grid lines than across the grid lines.

Although a smaller number of grid lines is shown in grid 108 in FIG. 17 compared to grid 107 in FIG. 16, it shall be appreciated that grid 108 may instead comprise a same or even a higher number of grid lines compared to grid 107. More generally, the numbers of grid lines may be different from what is shown in the figures.

The example of FIG. 17 can in particular be used as an alternative to the example of FIG. 16, i.e. for the same processing mode. It shall be understood that such alternative grids with parallel grid lines can similarly be defined for the examples of FIGS. 3, 5, 7, 9, 11 and 13. In particular, a direction of such parallel grid lines may then correspond to a central one of the non-parallel grid lines as shown in those figures, thus corresponding to FIG. 17 with respect to FIG. 16.

In one or more grids, preferably each grid, of the at least one virtual grid 100-108, a spacing between the positions may be smaller along the grid lines than across the grid lines. In this way, it may be taken into account that a maximum resolution of an ultrasound imaging array is normally larger in a so-called depth direction than in directions transverse thereto, e.g. a so-called angular direction.

If a filter, e.g. a post-processing filter, is applied to results of the processing, that filter may advantageously be applied only in one or more directions along the grid lines, in particular not in any direction across the grid lines.

As shown in the present examples, the predetermined area of interest 6 may be non-rectangular, for example having a trapezoidal shape.

The at least one virtual grid of positions 100-108 may be predetermined based on one or more of the following: one or more properties, in particular one or more positions, of the predetermined area of interest 6; a predetermined spacing, e.g. angular spacing, between the grid lines (e.g. at the at least one transmitter 3); a predetermined spacing between the positions along the grid lines; a position of the at least first ultrasound transmitter 3; a position of the plurality of ultrasound receivers 4; a position of a reflection surface 7 of the object 1; a frequency and/or wavelength of the at least first ultrasound signal; a sound velocity of the interior material of the object 1; and a sound velocity of a material 8 which is present between the interior material of the object 1 on the one hand and one or more of the at least first ultrasound transmitter 3 and the plurality of ultrasound receivers 4 on the other hand.

The skilled person with the benefit of the present disclosure will appreciate how these and other items may be used in predetermining the at least one virtual grid 100-108, in particular when considering that, as explained, each grid of the at least one virtual grid 100-108 is defined along a series of grid lines which extend along respective directions of which at least a first one corresponds to an at least approximate local direction of a spatial gradient G of ultrasound travel time from the at least first ultrasound transmitter 3 to one or more of the plurality of ultrasound receivers 4.

FIGS. 3, 5, 7, 9, 11, 13, 16 and 17 also show parts of an exemplary system for carrying out a method as described herein. The system comprises a group of transmitters 3, a group of receivers 4 and a controller 9 communicatively connected to the group of transmitters 3 and the group of receivers 4. The controller 9 is configured to carry out step c. of the method. Such a system may be used for carrying out the method described herein. The controller may additionally be configured to carry out step a. and step b. of the method. The system may further comprise a user interface 10 configured to obtain user input from a user, wherein the predetermining of the at least one virtual grid 100-108 of positions is at least partly based on the user input.

While the invention has been explained using exemplary embodiments and drawings, these do not limit the scope of the appended claims. For the purpose of clarity and a concise description features are described herein as part of the same or separate embodiments, however, it will be appreciated that the scope of the invention may include embodiments having combinations of all or some of the features described. Many alternatives, variations and extensions are possible as will be readily understood by the skilled person.

In the claims, any reference sign placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for examining interior material of an object from a proximal surface of the object using ultrasound, wherein the method comprises the steps of:

a. transmitting at least a first ultrasound signal, by at least a first ultrasound transmitter of a predetermined group of ultrasound transmitters, to the interior material of the object, wherein in the interior material of the object reflections and/or diffractions of the first ultrasound signal occur, b. receiving reflections and/or diffractions of the first ultrasound signal from the interior material of the object using a plurality of ultrasound receivers of a predetermined group of ultrasound receivers, the plurality of ultrasound receivers being acoustically coupled to the proximal surface of the object at positions that are distributed in at least one dimension of the proximal surface of the object, and wherein, with each of the plurality of ultrasound receivers, a receiving signal is generated from the received reflections and/or diffractions of the at least first ultrasound signal from the interior material of the object, and c. processing in combination the receiving signals generated by the plurality of the ultrasound receivers in order to determine, according to the principle of inverse wave field extrapolation, where in the interior material of the object, reflections and/or diffractions of the transmitted first ultrasound signal occurred, wherein the processing is based on a data representation using at least one predetermined virtual grid of positions, wherein grid positions of each virtual grid of positions, of the at least one predetermined virtual grid of positions, are each at a predetermined area of interest that includes a part of the interior material of the object, wherein each virtual grid of positions, of the at least one predetermined virtual grid of positions, is defined along a series of grid lines that extend along respective directions, wherein at least a first direction, of the respective directions, corresponds to an at least approximate local direction of a spatial gradient of ultrasound travel time from the at least first ultrasound transmitter to one or more of the plurality of ultrasound receivers, and wherein the spatial gradient of ultrasound travel time at least partly results from different grid positions, of the grid positions of each virtual grid of positions, being associated with different travel times from the at least first ultrasound transmitter to the one or more of the plurality of ultrasound receivers.

2. The method according to claim 1, wherein, for at least one virtual grid of the at least one virtual grid, at least one further one of the respective directions of the grid lines corresponds to a respective at least approximate local direction of the spatial gradient of ultrasound travel time from the at least first ultrasound transmitter to one or more of the plurality of ultrasound receivers.

3. The method according to claim 1, wherein, for at least one virtual grid of the at least one virtual grid, at least one further one of the respective directions of the grid lines is parallel to the first respective direction.

4. The method according to claim 1, wherein, for at least one virtual grid of the at least one virtual grid, the grid lines do not mutually intersect within the predetermined area of interest.

5. The method according to claim 1, wherein at least one respective grid line of at least one virtual grid of the at least one virtual grid extends at an angle with a local main direction of sound propagation during use.

6. The method according to claim 1, wherein the at least one predetermined virtual grid comprises a plurality of mutually different predetermined virtual grids.

7. The method according to claim 1, wherein the at least one virtual grid comprises a virtual grid of which at least one of the respective grid lines does not intersect a region where the plurality of ultrasound receivers and/or the at least first ultrasound transmitter are acoustically coupled to the proximal surface.

8. The method according to claim 1, wherein the at least one virtual grid comprises a virtual grid of which the respective grid lines have a common intersection zone that is outside a region where the plurality of ultrasound receivers and/or the at least first ultrasound transmitter are acoustically coupled to the proximal surface.

9. The method according to claim 1, wherein the at least one virtual grid comprises a virtual grid of which the respective grid lines have a common intersection zone at the proximal surface of the object, wherein, with respect to the area of interest, the common intersection zone is beyond where the plurality of ultrasound receivers and/or the at least first ultrasound transmitter are acoustically coupled to the proximal surface.

10. The method according to claim 1, wherein the object is provided with at least one predetermined reflection surface, wherein the at least one virtual grid comprises a virtual grid of which the respective grid lines have a common intersection zone at the at least one predetermined reflection surface.

11. The method according to claim 1, wherein the object is provided with at least one predetermined reflection surface, wherein the at least one virtual grid comprises a virtual grid of which the respective grid lines have a common intersection zone that, with respect to the proximal surface of the object, is beyond the at least one predetermined reflection surface, and wherein the area of interest defines a range along the outside surface and/or along the at least one predetermined reflection surface, wherein the common intersection zone is outside the range.

12. The method according to claim 1, wherein the object is provided with at least one predetermined reflection surface, wherein the at least one virtual grid comprises a virtual grid of which the respective grid lines have a common intersection zone that is outside the object, at a same side of the proximal surface as the plurality of ultrasound receivers and/or the at least first ultrasound transmitter, and wherein the area of interest defines a range along the outside surface and/or along the at least one predetermined reflection surface, wherein the common intersection zone is outside the range.

13. The method according to claim 1, wherein the object is provided with at least one predetermined reflection surface, wherein the at least one virtual grid comprises a virtual grid of which the respective grid lines have a common intersection zone that, with respect to the proximal surface of the object, is beyond the at least one predetermined reflection surface, and wherein the area of interest defines a range along the outside surface and/or along the at least one predetermined reflection surface, wherein the common intersection zone is within the range.

14. The method according to claim 1, wherein the at least one virtual grid comprises a virtual grid of which the respective grid lines have a common intersection zone that is outside the object, at a same side of the proximal surface of the object as the plurality of ultrasound receivers and/or the at least first ultrasound transmitter, and wherein the area of interest defines a range along the outside surface and/or along a predetermined reflection surface of the object.

15. The method according to claim 1, wherein the at least one virtual grid comprises a virtual grid of which the respective grid lines have a common intersection zone at the proximal surface of the object, and wherein the common intersection zone is in a region where the plurality of ultrasound receivers and/or the at least first ultrasound transmitter are acoustically coupled to the proximal surface.

16. The method according to claim 1, wherein a result of the processing based on the at least one predetermined virtual grid is subsequently converted to a result expressed in a rectangular grid.

17. The method according to claim 1, wherein in at least one virtual grid of the at least one virtual grid, a spacing between the grid positions is smaller along the grid lines than across the grid lines, at least in one area of the respective virtual grid.

18. The method according to claim 1, wherein at least one filter is applied to results of the processing, the at least one filter being applied only in one or more directions along the grid lines.

19. The method according to claim 1, wherein the predetermined area of interest is non-rectangular.

20. The method according to claim 1, wherein the at least one virtual grid of positions is predetermined based on at least one of the group consisting of:

one or more properties of the predetermined area of interest;

a predetermined spacing between the grid lines;

a predetermined spacing between the grid positions along the lines;

a position of the at least first ultrasound transmitter;

a position of the plurality of ultrasound receivers;

a position of a reflection surface of the object;

a frequency and/or wavelength of the at least first ultrasound signal;

a sound velocity of the interior material of the object; and a sound velocity of a material that is present between the interior material of the object on the one hand and one or more of the at least first ultrasound transmitter and the plurality of ultrasound receivers on the other hand.

21. The method according to claim 1, wherein the at least one virtual grid of positions is predetermined based on an estimate of a spatial gradient of ultrasound travel time from the at least first ultrasound transmitter to one or more of the plurality of ultrasound receivers.

22. The method according to claim 1, wherein the object is provided with at least one predetermined reflection surface, and wherein if in step b. ultrasound is received due to reflections and/or diffractions at a first predetermined position, at least a portion of the received signal has not reflected within the object on the at least one predetermined reflection surface.

23. The method according to claim 1, wherein the object is provided with at least one predetermined reflection surface, and wherein if in step b. ultrasound is received due to reflections and/or diffractions at the first predetermined position of the ultrasound transmitted in step a., at least a portion of the received signal has reflected within the object on the at least one predetermined reflection surface before the ultrasound signal has reached the predetermined position.

24. The method according to claim 1, wherein if in step b. ultrasound is received due to reflections and/or diffractions at the first predetermined position of the ultrasound transmitted in step a., at least a portion of the received signal has reflected within the object on the at least one predetermined reflection surface after the ultrasound signal has reached the first predetermined position.

25. The method according to claim 22, wherein in step c. the receiving signals are processed according to different modes respectively wherein each mode of the modes is determined by whether or not and if so which at least one reflection on the at least one predetermined reflection surface is taken into account so that the same receiving signals are used to process the receiving signals according to different modes respectively.

26. The method according to claim 25, wherein in step c. the receiving signals are processed according to multiple of the different modes.

27. The method according to claim 26, wherein the respective results of the processing according to the different modes are subsequently combined into an overall result.

28. A system for carrying out the method according to claim 1, comprising a group of transmitters, a group of receivers and a controller communicatively connected to the group of transmitters and the group of receivers, wherein the controller is configured to carry out step c. of the method.

29. The system according to claim 28, wherein the controller is configured to carry out step a. and step b. of the method.

30. The system according to claim 28, further comprising a user interface configured to obtain user input from a user, wherein the predetermining of the at least one virtual grid of positions is at least partly based on the user input.

* * * * *